United States Patent
Hew et al.

(10) Patent No.: US 9,374,379 B1
(45) Date of Patent: Jun. 21, 2016

(54) APPLICATION UNLOCK

(71) Applicant: AOL Inc., Dulles, VA (US)

(72) Inventors: Chin Foh Hew, Potomac, MD (US);
Thu Rein Kyaw, Reston, VA (US)

(73) Assignee: AOL INC., Dulles, VA (US)

(*) Notice: Subject to any disclaimer, the term of this patent is extended or adjusted under 35 U.S.C. 154(b) by 0 days.

(21) Appl. No.: 14/665,161

(22) Filed: Mar. 23, 2015

Related U.S. Application Data

(63) Continuation of application No. 11/926,644, filed on Oct. 29, 2007, now abandoned.

(60) Provisional application No. 60/946,262, filed on Jun. 26, 2007.

(51) Int. Cl.
G06F 17/00 (2006.01)
H04L 29/06 (2006.01)
H04L 29/08 (2006.01)

(52) U.S. Cl.
CPC .............. *H04L 63/108* (2013.01); *H04L 67/10* (2013.01)

(58) Field of Classification Search
CPC ........ H04L 63/20; H04L 63/108; H04L 67/10
USPC .......................................................... 726/1
See application file for complete search history.

(56) References Cited

U.S. PATENT DOCUMENTS

| | | |
|---|---|---|
| 5,382,983 A | 1/1995 | Kwoh et al. |
| 5,640,145 A | 6/1997 | Newham |
| 5,813,010 A | 9/1998 | Kurano et al. |
| 5,883,955 A | 3/1999 | Ronning |
| 5,907,617 A | 5/1999 | Ronning |
| 5,949,471 A | 9/1999 | Yuen et al. |
| 5,973,683 A | 10/1999 | Cragun et al. |
| 6,005,939 A | 12/1999 | Fortenberry et al. |
| 6,037,969 A | 3/2000 | Lim et al. |
| 6,144,401 A | 11/2000 | Casement et al. |
| 6,179,205 B1 | 1/2001 | Sloan |
| 6,188,995 B1 | 2/2001 | Garst et al. |
| 6,199,116 B1 | 3/2001 | May et al. |
| 6,273,335 B1 | 8/2001 | Sloan |
| 6,426,705 B1 | 7/2002 | Wischoeffer |
| 6,662,365 B1 | 12/2003 | Sullivan et al. |
| 6,684,240 B1 | 1/2004 | Goddard |
| 6,701,523 B1 | 3/2004 | Hancock et al. |
| 6,722,984 B1 | 4/2004 | Sweeney, Jr. et al. |
| 7,131,058 B1 | 10/2006 | Lapstun et al. |
| 2003/0236977 A1* | 12/2003 | Levas et al. ................... 713/158 |
| 2003/0237088 A1 | 12/2003 | Macrae et al. |

(Continued)

*Primary Examiner* — Teshome Hailu
(74) *Attorney, Agent, or Firm* — Finnegan, Henderson, Farabow, Garrett & Dunner, LLP

(57) ABSTRACT

Techniques are provided for controlling access to an application. A first request to use an application may be received from a first user and an application access rule associated with the first user may be accessed. Based on the application access rule, it may be determined that permission is required for the first user to use the application. In response, a second request may be sent to a second user requesting permission for the first user to use the application and a response to the second request may be received from the second user. The response may include authorization information used in determining whether the first user has permission from the second user to use the application. In response to receiving the response from the second user, the first request to use the application initiated by the first user may be handled based on the authorization information.

18 Claims, 6 Drawing Sheets

(56) References Cited

U.S. PATENT DOCUMENTS

2004/0128506 A1* 7/2004 Blakley et al. ............... 713/170
2004/0148525 A1* 7/2004 Aida et al. .................. 713/201
2006/0287080 A1 12/2006 Bychkov
2007/0006325 A1* 1/2007 Gargaro .................... 726/27
2008/0148351 A1* 6/2008 Bhatia et al. ................ 726/2

* cited by examiner

400
Application Unlock Request

- 405 → Application: [       ]
- 410 → Users to Send:           Communication Method: ← 420
- 412 → ☐ Mom_User         ☐ Instant Message ← 422
- 414 → ☐ Dad_User          ☐ E-Mail ← 424
- 416 → ☐ Guardian_User    ☐ Website ← 426
                                      ☐ Text Message ← 428
- 430 → Extra Request Information:
- 432 → [                    ]

440 → [Submit]   [Cancel] ← 450

Fig. 4

| User | Supervisor User | Application Type | Permission Needed | Time Allowed | Days Allowed | Restrictions |
|---|---|---|---|---|---|---|
| User1 | N/A | Everyone Rating | No | Any | All | No Internet Access |
| User1 | Mom_User | Teen Rating | Restricted Times | 7 AM – 8PM | All | No Internet; 2 Hour Limit |
| User1 | Dad_User | Mature Rating | Yes | 1 PM – 4 PM | Sat & Sun | No Blood; Censor Lang. |
| User1 | Mom_User Dad_User | Space Zombies | Yes | 1 PM – 4 PM | Sat | Levels 1-3 Only |
| User1 | Mom_User | Instant Messenger | Restricted Times | 10 AM – 6 PM | All | Approved Buddies |
| User1 | Guardian_User | Web Browser | Yes | 10 AM – 6 PM | All | No Adult; No Chat Rooms |

Columns: 505, 510, 515, 520, 525, 530, 535
Rows: 540, 545, 550, 555, 560, 565

Fig. 5

APPLICATION UNLOCK

CROSS REFERENCE TO RELATED APPLICATIONS

The present application is a continuation of and claims priority to U.S. application Ser. No. 11/926,644, filed Oct. 29, 2007, which claims priority to U.S. Provisional Application No. 60/946,262, filed Jun. 26, 2007, the contents of which are expressly incorporated herein by reference in their entireties.

TECHNICAL FIELD

This disclosure relates to controlling access to an application.

BACKGROUND

Users may use an electronic device to perceive content made available by an application executing on the electronic device or made available over a network, such as the Internet. The content made available by an application executing on an electronic device or made available over a network may be inappropriate for some users. A supervisory user may determine that certain content or certain uses of electronic devices have little or no value to a user who they are supervising. Accordingly, the supervisory user may regulate a user's access to content and use of electronic devices.

SUMMARY

In one aspect, a first request to use an application is received. The first request is initiated by a first user. An application access rule associated with the first user is accessed and it is determined that permission is required for the first user to use the application based on the accessed application access rule. In response to determining that permission is required for the first user to use the application, a second request is sent to a second user requesting permission for the first user to use the application. A response to the second request is received from the second user. The response includes authorization information used in determining whether the first user has permission from the second user to use the application. In response to receiving the response to the second request from the second user, the first request to use the application initiated by the first user is handled based on the authorization information.

Implementations may include one or more of the following features. For example, the response received from the second user may include authorization information indicating that the first user has permission from the second user to use the application. A first request may be received, over a network, from a remote client device. The first request may be a request to use an application executed locally by the remote client device.

In some implementations, it may be determined that the first user has permission from the second user to use the application, and a signal may be sent to the remote client device to enable the application to execute locally on the remote client device. In other implementations, it may be determined that the first user does not have permission from the second user to use the application, and a signal may be sent to the remote client device to prevent the application from executing locally on the remote client device.

A first request may be received, over a network, from a remote client device. The first request may be a request to use an application hosted by a remote server. In some examples, it may be determined that the first user has permission from the second user to use the application, and a signal may be sent to the remote client device to enable the remote client device to use the application hosted by the remote server. In other examples, it may be determined that the first user does not have permission from the second user to use the application, and a signal may be sent to the remote client device to prevent the remote client device from using the application hosted by the remote server.

A second request may be sent, over a network, to a remote client device associated with the second user. The remote client device associated with the second user may be different from a device used to execute the application. An electronic mail message may be sent to the second user, an instant message may be sent to the second user, or a text message may be sent to the second user. A web page accessible by the second user may be updated, and web page data including the second request to the second user may be transmitted in response to the second user requesting access to the web page.

In some implementations, the first user may be enabled to use the application in response to determining that the first user has permission from the second user to use the application based on the response to the second request from the second user. The application access rule may include restrictions on use of the application, and the first user may be enabled to use the application with the restrictions included in the application access rule. The restrictions included in the application access rule may include a restriction on a time of use of the application, a restriction of a number of executions of the application, a restriction on a time of day for using the application, a restriction on network access allowed for the application, a restriction on the content provided by the application, and a restriction on the features available in executing the application.

In some examples, the response to the second request from the second user may include restrictions on use of the application; and the first user may be enabled to use the application with the restrictions included in the response to the second request from the second user. The response to the second request from the second user may include a restriction on a time of use for the application, the first user may be enabled to use the application for a time period defined by the restriction on the time of use for the application, and the first user may be prevented from using the application after the first user has used the application for the time period defined by the restriction on the time of use for the application.

The first user may be prevented from using the application in response to determining that the first user does not have permission from the second user to use the application based on the response to the second request from the second user. The application access rule associated with the first user may be updated based on the response to the second request from the second user. In one example, the application access rule may be updated such that the user does not require permission to use the application in response to future requests to use the application initiated by the first user. In another example, the application access rule may be updated such that the user does not require permission to use the application in response to future requests to use the application initiated by the first user conditioned on the request being made at a particular time of day. In a further example, the application access rule may be updated such that the user does not require permission to use the application in response to a limited number of future requests to use the application initiated by the first user.

A third request may be received from the second user for additional information related the first request to use the application, and a response to the third request may be sent to the second user. The response to the third request may include additional information related to the first request to use the application. The third request may be received from the second user and the response to the third request may be sent to the second user prior to the response to the second request being received from the second user. The additional information may include information related to one or more of a rating for the application, one or more capabilities of the application, a summary of the application, an identity of the first user requesting access, current usage by the first user of other applications or an electronic device, and permission decisions of other users in similar situations.

In some implementations, a third request to send a question to the first user may be received from the second user. The third request may include a question from the second user and may be sent by the second user in response to the second user receiving the second request. The question from the second user may be sent to the first user, an answer to the question may be received from the first user, and the answer to the question may be sent to the second user. The third request may be received, the question may be sent, the answer may be received, and the answer may be sent prior to the response to the second request being received from the second user.

The first user may be authenticated in response to receiving the first request to use the application, and the second user may be authenticated in response to receiving the response to the second request from the second user. The first user may be authenticated using information included in the first request to use the application, and the second user may be authenticated using information included in the response to the second request from the second user. The first request to use the application may include information identifying a communication method with which to contact the second user, and the second request may be sent to the second user using the communication method identified in the first request to use the application. The first request to use the application may include additional information added by the first user to provide to the second user, and the second request may be sent to the second user including the additional information added by the first user.

In some examples, the application may be a first application, and a third request to use a second application may be received. The third request may be initiated by the first user and the second application may be different from the first application. A second application access rule associated with the first user and the second application may be accessed and it may be determined that permission is not required for the first user to use the second application based on the second application access rule. In response to determining that permission is not required for the first user to use the second application, the first user may be enabled to use the second application.

Information related to permission decisions by other users in similar situations as the second user may be provided to the second user prior to the response to the second request being received from the second user. For instance, information related to the percentage of other users that have granted or denied permission to use the application for a person approximately the same age as the first user may be provided to the second user.

Information related to recent application usage of the first user may be provided to the second user prior to the response to the second request being received from the second user. For example, information related to a time the first user has been using a first application or first application type may be provided to the second user prior to receiving the response to the second request from the second user.

Implementations of the described techniques may include hardware, a method or process, or computer software on a computer-accessible medium. The details of one or more implementations are set forth in the accompanying drawings and the description below. Other features will be apparent from the description and drawings.

DESCRIPTION OF DRAWINGS

FIG. 4 illustrates an example of a user interface for initiating an application unlock request.

FIG. 5 illustrates an example of a data structure used in controlling use of applications.

DETAILED DESCRIPTION

Figure 1:
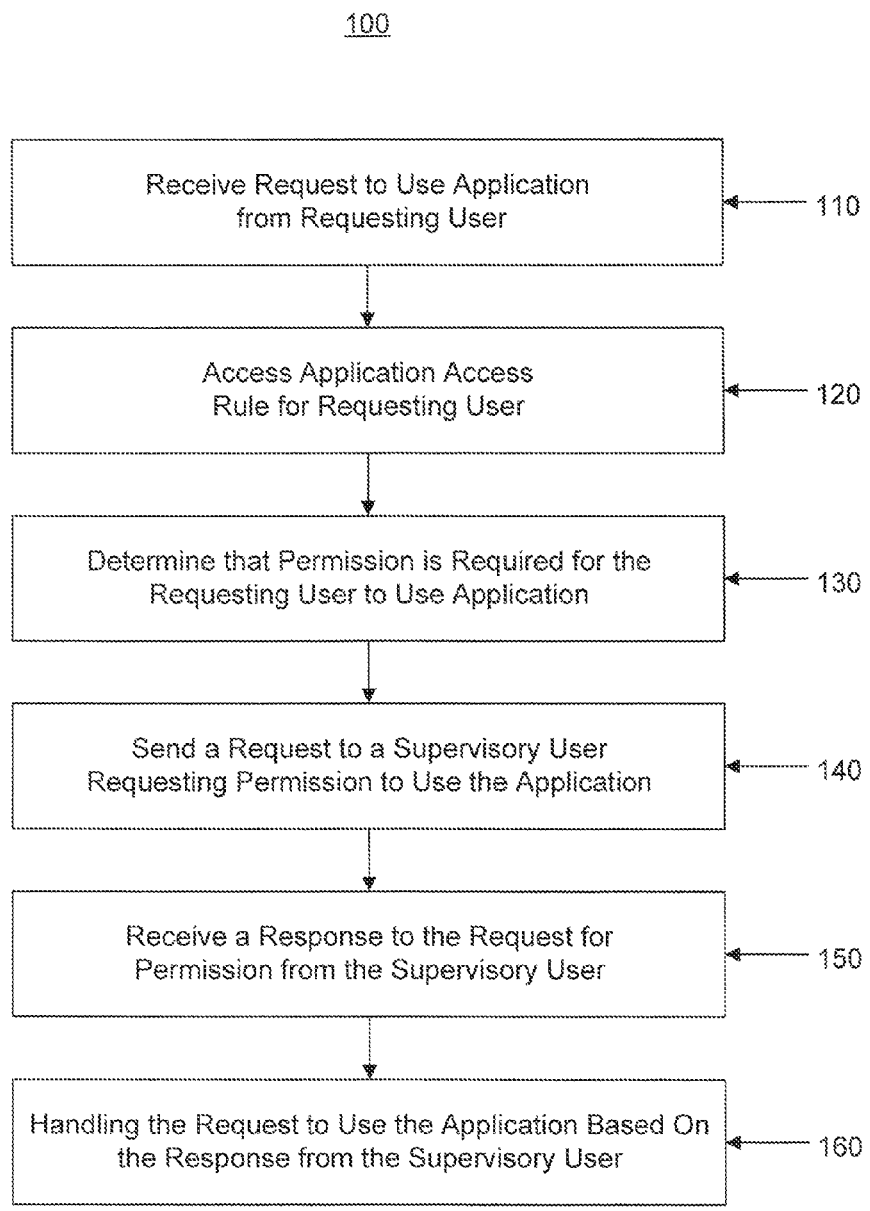
FIG. 1 is a flow chart of a process for handling a request to use an application from a requesting user.

Techniques are provided for enabling a supervisory user to control a requesting user's access to applications available for execution on an electronic device. In some implementations, when a requesting user attempts to execute an application on an electronic device, the electronic device temporarily prevents the application from executing to determine whether permission is needed for the requesting user to execute the application. If the requesting user needs permission to execute the application, an electronic message is sent to a supervisory user requesting a decision from the supervisory user on whether the supervisory user would like to grant the requesting user permission to execute the application. The supervisory user sends a response to the electronic message either granting or denying permission and the request to execute the application is handled in accordance with the supervisory user's response to the electronic message. For example, the requesting user may be prevented from executing the application if the supervisory user denies permission and the requesting user may be allowed to execute the application if the supervisory user grants permission.

In some implementations, application access control is provided by a remote device over a network. For example, when a requesting user attempts to execute a local application on an electronic device associated with the requesting user, the electronic device associated with the requesting user may temporarily prevent the application from executing and may send an electronic communication, over the network, to the remote device requesting instructions on whether or not to allow the requesting user to execute the application. The remote device determines whether the requesting user requires permission to execute the application (e.g., whether a supervisory user has set a rule that requires the requesting user to obtain permission prior to executing the application). If the requesting user does not require permission, the remote device sends an electronic communication, over the network, to the electronic device associated with the requesting user to enable the local application to execute on the electronic device associated with the requesting user. If the requesting user does require permission, the remote device sends an electronic communication, over the network, to an electronic device associated with a supervisory user requesting permission for the requesting user to execute the application. The supervisory user receives the electronic communication and sends a response electronic communication, over the network, to the remote device to indicate whether or not the supervisory user grants the requesting user permission to execute the application. If the response electronic communication indicates that the supervisory user grants the requesting user permission to execute the application, the remote device sends an electronic communication, over the network, to the electronic device associated with the requesting user to enable the local application to execute on the electronic device associated with the requesting user. If the response electronic communication indicates that the supervisory user denies the requesting user permission to execute the application, the remote device sends an electronic communication, over the network, to the electronic device associated with the requesting user to prevent the local application to execute on the electronic device associated with the requesting user. In these implementations, a remote device may be configured to control local execution of applications on user devices. Accordingly, a supervisory user (e.g., a parent) may be able to control a requesting user's (e.g., a child) use of applications on a local device from a remote location.

In some implementations, a supervisory user may be able to control any aspect of execution of an application on an electronic device of a requesting user. As discussed above, a supervisory user may be able to control whether or not a requesting user may execute an application. In addition, a supervisory user may be able to control the manner in which a requesting user is allowed to execute an application. For example, the supervisory user may enable the requesting user to execute the application, but only for a specified period of time (e.g., a time limit or a time of day restriction). In another example, the supervisory user may be able to control features or content available by executing the application. In this example, the supervisory user may limit the application's ability to access a network (e.g., the Internet) or may only enable the requesting user to execute a censored version of the application (e.g., a version censored for language or violence). For instance, the supervisory user may limit a first person shooter game by preventing a multi-player network mode and only enabling a single player mode or may limit the game from engaging in messaging services (e.g., chats or instant messaging sessions) offered by the game. The supervisory user also may censor the first person shooter game for language and violence by configuring the game to execute in a mode that does not use expletive language and does not display blood when a character in the game is shot. In some implementations, a remote device may be configured to have complete control over a local application executing a requesting user's device such that the remote device may be able to apply restrictions (e.g., time limits, feature modification, etc.) to the requesting user's execution of the application. Feature modification may include modifying the content available on or through the application and limiting functions or aspects of the application (e.g., number of levels, ability to perform instant messaging through the application, etc.). In some examples, application access rules may be set by a supervisory user and may be used in performing application access control in addition to or in place of permission requests to the supervisory user.

FIG. 1 illustrates an example of a process 100 for handling a request to use an application from a requesting user. The operations in flow chart 100 are described generally as being performed by a processor. In some implementations, the processor may be included in an electronic device or system configured to send and receive communications over a network. For example, the processor may be included in an electronic device or system of a host, a content provider, a service provider, or a user. In another example, the operations in flow chart 100 may be performed by multiple processors included in one or more electronic devices or systems.

The processor receives a request to use an application from a requesting user (110). For example, the processor may receive, over a network, an electronic communication requesting use of an application from an electronic device associated with the requesting user. In this example, the requesting user may attempt to execute an application using the electronic device (e.g., select an icon in a graphical user interface or enter a command configured to initiate execution of the application). In response to the attempt to execute the application, the electronic device may initially prevent the application from executing and send an electronic communication to the processor requesting permission to execute the application. The processor receives the electronic communication and processes the request to execute the application. The request may be to execute a local application executed solely by the electronic device associated with the requesting user or may be a request to access a network-based application (e.g., an application offered by a server connected to the Internet). The application may be a game, an Internet browser, an instant messaging program, an electronic mail program, a word processor, a spreadsheet, a media player, or any other type of application configured to execute on an electronic device.

In some implementations, the processor may require the requesting user to provide authentication information in response to receiving the request. For example, the processor may require the requesting user to enter authentication credentials (e.g., a username and password) or provide an authentication token (e.g., a key, a cookie, etc.). The processor may use a prior authentication of the requesting user to authenticate the user. Authentication of the requesting user may be able help reduce cases in which a user impersonates another user to gain access to an application with which the user does not have permission to access.

The request to use the application may include information sufficient for the processor to process the request to use the application. For example, the request to use the application may include one or more of identity information for the requesting user, authentication information for the requesting user, application information associated with the application to which the requesting user is requesting access, additional information added by the requesting user, information related to how to handle the access request, time information, usage information for the electronic device, and information related to a supervisory user.

In some implementations, the received request is automatically sent in response to the requesting user attempting to execute the application. In other implementations, the received request is sent in response to input from the requesting user. In these implementations, the requesting user may add information to the request or otherwise customize features of the request.

The processor accesses an application access rule in response to receiving the request (120). For example, the processor may access an application access rule from electronic storage associated with the processor. In another example, the processor may receive the application access rule from the electronic device associated with the requesting user (e.g., in the request) or another electronic device. The processor may use the application access rule to process the request to use the application from the requesting user.

The application access rule may be associated with the user, associated with the application, or associated with a combination of the user and the application. For example, the processor may locate application access rules associated with the requesting user and, from those, identify an appropriate application access rule for the application. In this example, the processor may identify an application access rule that is specifically set for the application or may identify an application access rule associated with types of applications similar to the application (e.g., applications that have a rating that is the same as the requested application). For example, if the application has a "Teen" rating, the processor may identify an application access rule associated with "Teen" rated applications and, if the application has a "Mature" rating, the processor may identify a different application access rule associated with "Mature" rated applications. The application access rule may include information sufficient to determine whether the requesting user is allowed to execute the application or whether permission is required for the requesting user to execute the application. If permission is not required, the processor may send an electronic communication to the electronic device associated with the requesting user to enable the electronic device to execute the application. If permission is required, further processing is needed to handle the request. The application access rule may also include conditions that dictate when permission is and is not needed (e.g., permission may only be needed for executing the application after 8 p.m.). The application access rule may further include restrictions to place on the requesting user's execution of the application (e.g., time limits or feature modifications). For example, the application access rule may include a restriction that the application only may be executed for one hour or may include a restriction to modify a chat or instant messaging feature to only allow communications with users on an approved list. Implementations may include accessing multiple application access rules or handling all requests to use applications in the same manner without accessing any application access rules. Generic application access rules may be used when the processor is unable to identify a specific application access rule appropriate for the application.

The processor determines that permission is required for the requesting user to use the application (130). For example, the processor may analyze the application access rule and determine that permission is required for the requesting user to use the application. In some implementations, the processor may access information included in the application access rule that indicates that permission is always required when the requesting user attempts to execute the application. In other implementations, the processor may access information included in the application access rule that indicates that permission is required if certain conditions are met. In these implementations, the processor may analyze properties associated with the request to use the application and determine that permission is required because the certain conditions are met. For example, permission may not be needed if the request to use the application is received at 1:00 P.M., but permission may be needed if the request to use the application is received at 10:00 P.M. In another example, permission may not be needed if the user has used the application less than two hours since the day prior to the request to use the application, but permission may be needed if the user has used the application more than two hours since the day prior to the request to use the application. The processor may determine that permission is required for all requests to use an application.

In response to determining that permission is required for the requesting user to use the application, the processor sends a request to a supervisory user requesting permission for the requesting user to use the application (140). For example, the processor may send an electronic communication, over a network, to a device associated with the supervisory user requesting permission for the first user to use the application. In this example, the processor may generate and send an electronic mail message, an instant message, a text message, a phone message, a fax message, or other type of electronic message to the supervisory user requesting permission from the supervisory user for the requesting user to use the application. The processor may identify the supervisory user to which to send the request for permission. For example, the processor may identify the supervisory user based on the request to use the application (e.g., supervisory user identity information may be included in the request), the accessed application access rule (e.g., the application access rule may include an identification of the supervisory user), or other electronic information accessed as part of the request processing.

The request for permission sent to the supervisory user may include information identifying the requesting user, information identifying the application, and any other information that may assist a supervisory user in making a permission decision. The request for permission may be sent immediately or delayed based on the request to use the application (e.g., the request may indicate that the user wishes to execute the application immediately or at some later date). In some implementations, the request to use the application, the accessed application access rule, or other electronic information accessed as port of the request processing may be used to determine the method of sending the request for permission to the supervisory user. In some examples, the request for permission may be sent to the supervisory user in response to the supervisory user requesting the request for permission. For example, in response to determining that permission is required for the requesting user to use the application, the processor may update web page data for a web page associated with the supervisory user (or the requesting user) to include the request for permission. In this example, the request for permission is sent to the supervisory as part of the web page when the supervisory user requests access to the web page.

The processor receives, from the supervisory user, a response to the request for permission (150). For example, the processor may receive, over a network, an electronic communication from an electronic device associated with the supervisory user including a response to the request for permission. The electronic communication may include authorization information with which the processor may use to determine whether the supervisory user has granted permission for the requesting user to use the application. In some implementations, the response to the request includes information indicating whether or not the supervisory user has given the requesting user permission to use the application. In other implementations, receipt of the response alone may be sufficient for the processor to determine whether or not the supervisory user has given the requesting user permission to use the application (e.g., if a response is received, permission is granted and, if no response is received, permission is not granted).

The response may be sent to the processor by an electronic device associated with the supervisory user in response to the electronic device associated with the supervisory user receiving the request for permission. For example, the electronic device associated with the supervisory user may render a user interface of the request for permission for perception by the supervisory user. In this example, the electronic device associated with the supervisory user may receive user input from the supervisory user indicating whether or not the supervisory user grants the requesting user permission to use the application and generate a response to the request for permission based on the user input. In another example, the supervisory user may set rules for responding to requests for permission on the electronic device associated with the supervisory user and the electronic device may automatically generate a response to the request for permission based on the rules.

In some implementations, the response to the request for permission may indicate that the supervisory user grants the requesting user limited permission to execute the application. For example, the response to the request for permission may include conditions or restrictions to place on the use of the application by the requesting user. In another example, the response to the request for permission may include information indicating that conditions or restrictions set in the application access rule should be imposed on the requesting user's use of the application. The conditions or restrictions may include one or more of a time limit for use of the application, a limit on a number of times the application may be executed, a time of day restriction, a day or date restriction, a restriction on network access by the application, a restriction on the content provided by the application (e.g., censor language, violence, sexual content, etc.), and a restriction on features of the application (e.g., eliminate instant messaging or chat features of the application).

In some implementations, the response may indicate permission of the supervisory user for a single use of the application by the requesting user. For example, the response may indicate that the supervisory user either grants or denies permission for the requesting user to use the application on the single occasion associated with the request and permission of the supervisory user is needed for future uses of the application. In other implementations, the response may indicate permission of the supervisory user for future uses (e.g., a certain number of uses or unlimited future uses) of the application by the requesting user. For example, the response may indicate that the requesting user has permission to use the application on future occasions without requesting permission from the supervisory user. The application access rule for the application associated with the user may be updated based on the information provided in the response to the request for permission received from the supervisory user.

In some implementations, the processor may require the supervisory user to provide authentication information in response to receiving a response to the request for permission. For example, the processor may require the supervisory user to enter authentication credentials (e.g., a username and password) or provide an authentication token (e.g., a key, a cookie, etc.). The processor may use a prior authentication of the supervisory user to authenticate the supervisory user. Authentication of the supervisory user may be able to help reduce cases in which a user impersonates the supervisory user to grant permission to use an application to a requesting user. Authentication information for the supervisory user may be included in the response to the request for permission.

The processor handles the request to use the application based on the response from the supervisory user (160). For example, the processor analyzes the response received from the supervisory user to determine whether or not the supervisory user has granted the requesting user permission to use the application and handles the request to use the application based on the determination. In this example, the processor prevents the requesting user from using the application conditioned on the processor determining that the supervisory user denies the requesting user permission to use the application and the processor enables the requesting user to use the application conditioned on the processor determining that the supervisory user grants the requesting user permission to use the application.

The processor may enable or prevent the requesting user from using the application by sending an electronic communication to the electronic device associated with the requesting user. The electronic communication may be used by the electronic device associated with the requesting user to control execution of the application on the electronic device associated with the requesting user. For example, the electronic communication may include a control signal configured to enable or prevent the application from executing on the electronic device associated with the user. The electronic communication may be the same for local applications executed by the electronic device and for network-based applications executed by the electronic device.

The electronic device associated with the requesting user may process the electronic communication in a variety of manners to control execution of the application. For example, the application itself may process the electronic communication to control execution of the application. In another example, a separate process running on the electronic device associated with the requesting user may process the electronic communication to control execution of the application. The application or the separate process running on the electronic device may be associated with a process being executed by the processor to perform the process 100. In implementations in which the application is a network-based application, the processor may control access to the application by controlling network communications from the electronic device that are related to the network-based application. In implementations in which the application is controlled by the processor, the processor may directly control access to the application by the electronic device associated with the requesting user.

In some implementations, the processor may handle the request by enabling the requesting user to use the application with certain restrictions or conditions. For example, the processor may determine restrictions or conditions to impose of the requesting user's use of the application by analyzing the response to the request for permission or by accessing information from the application access rule. The processor may send an electronic communication to the electronic device associated with the user indicating the restrictions or conditions to apply to execution of the application and the electronic device associated with the requesting user may configure the application to execute in accordance with the restrictions or conditions. For example, the electronic device may configure the application to execute without displaying blood or censoring curse words used by characters in the application. In another example, the electronic device may enable the application to execute for only a limited amount of time (e.g., one hour) after receiving the response to the request for permission. In other examples, the processor may monitor conditions or restrictions applied to execution of the application. For example, the processor may be configured to monitor the time with which the requesting user has been using an application and, when the processor determines that a time limit has been reached, the processor may send an electronic communication to the electronic device associated with the requesting user to cause the electronic device to stop execution of the application. Warnings may be provided to the requesting user to alert the requesting user that a time limit is approaching. Other information associated with the restrictions or conditions imposed on the requesting user's execution of the application may be provided to the requesting user.

Figure 2:
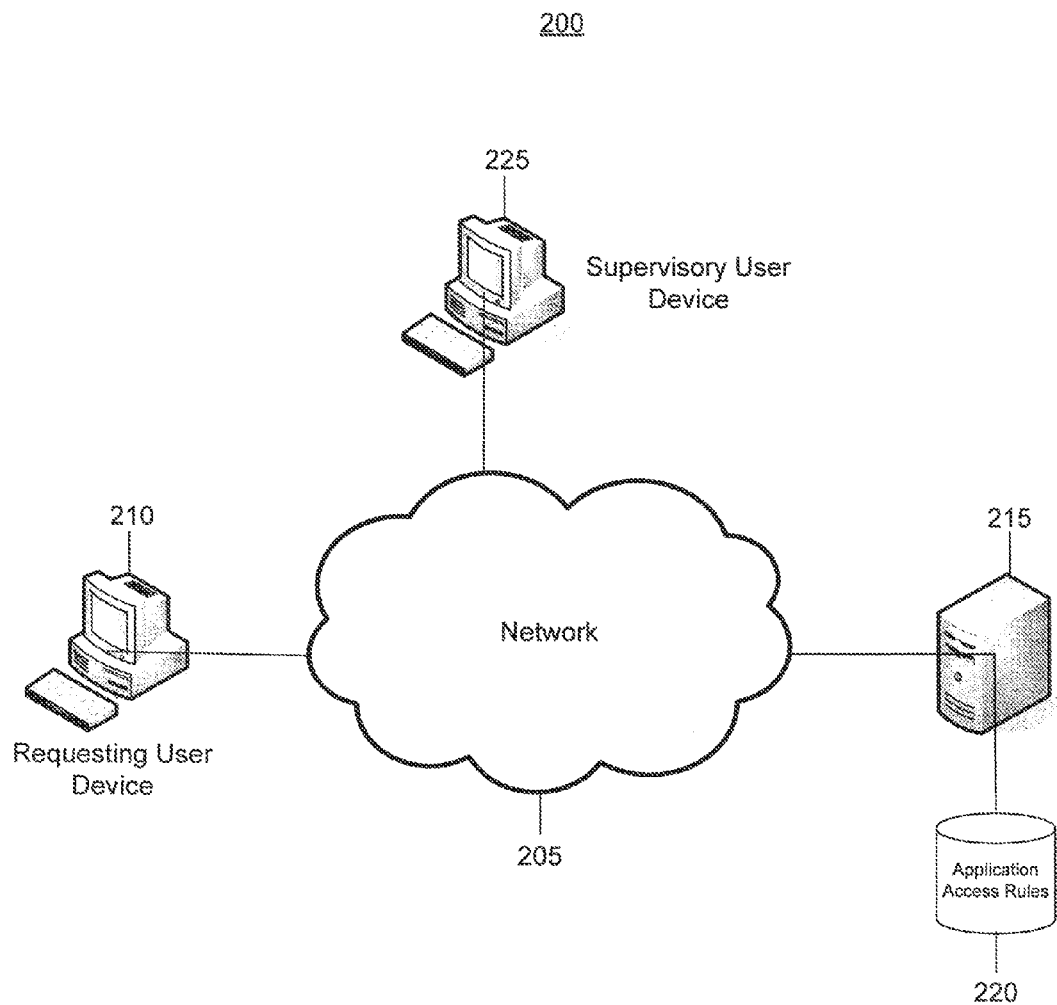
FIG. 2 is a block diagram of an electronic system configured to control use of applications.

FIG. 2 illustrates an example of an electronic system 200 configured to control use of applications. The electronic system 200 includes a network 205, a requesting user device 210, a service provider 215, and a supervisory user device 225. The network 205 facilitates communications between the requesting user device 210, the service provider 215, and the supervisory user device 225.

The network 205 is configured to enable exchange of electronic communications between devices connected to the network 205. For example, the network 205 may be configured to enable exchange of electronic communications between the requesting user device 210, the service provider 215, and the supervisory user device 225. The network 205 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. The network 205 may include multiple networks or subnetworks, each of which may include, for example, a wired or wireless data pathway. The network 205 may include a circuit-switched network, a packet-switched data network, or any other network able to carry electronic communications. For example, the network 205 may include networks based on the Internet protocol (IP) or asynchronous transfer mode (ATM).

The requesting user device 210 may be a general-purpose computer (e.g., a desktop personal computer, a workstation, or a laptop computer) that is configured to communicate with the service provider 215 over the network 205. In some implementations, the requesting user device 210 may be a mobile device or a device designed for a specific function. For example, the requesting user device 210 may include a cell phone, a smart phone, a tablet PC, a personal digital assistant ("PDA"), or any other portable device configured to communicate over a network and display information. For example, implementations may also include Blackberry devices, electronic organizers, iPod devices or other portable music players, other communication devices, and handheld or portable electronic devices for gaming, communications, and/or data organization. The requesting user device 210 may be a gaming console or another type of electronic device configured to execute a gaming application. The requesting user device 210 may be configured to execute applications locally on the requesting user device 210 and execute network-based applications hosted by devices (e.g., the service provider 215) connected to the network 205.

The requesting user device 210 may be configured to interact with the service provider 215 to enable the service provider 215 to control execution of applications on the requesting user device 210. For example, the requesting user device 210 may be configured to receive electronic communications from the service provider 215 and control execution of applications on the requesting user device 210 based on the received electronic communications. The requesting user device 210 may be configured to execute an application or process associated with the service provider 215 to enable the service provider 215 to control execution of applications on the requesting user device 210. Although FIG. 2 illustrates a single requesting user device 210 for brevity, actual implementations may include more (and, perhaps, many more) requesting user devices.

The service provider 215 is an electronic device (e.g., a server, host, content provider, etc.) configured to execute programs and exchange communications with the requesting user device 210 and the supervisory user device 225 over the network 205. For example, the service provider 215 may be configured to execute a program that controls execution of applications on the requesting user device 210. In this example, the service provider 215 may exchange communications with the requesting user device 210 to control execution of applications on the requesting user device 210. In some implementations, the service provider 215 may be configured to enable a supervisory user using the supervisory user device 225 to control a requesting user's use of applications on the requesting user device 210. For example, the service provider 215 may be configured to exchange communications with the supervisory user device 225 to determine decisions related to whether the supervisory user grants the requesting user permission to use applications on the requesting user device 210. The service provider 215 also may be configured to exchange communications with the supervisory user device 225 to enable the supervisory user to set application access rules for the requesting user. In some implementations, the service provider 215 may be configured to respond to requests for information from the requesting user device 210 or the supervisory user device 225, may be configured to facilitate exchange of messages between the requesting user device 210 and the supervisory user device 225, and may be configured to establish a communication session between the requesting user device 210 and the supervisory user device 225.

The service provider 215 also may be configured to perform other processes associated with implementing a system configured to control use of applications. For example, the service provider 215 may be configured to perform authentication of users of the system 200. The service provider 215 may authenticate users communicating with the service provider 215 using the requesting user device 210 or the supervisory user device 225. The service provider 215 may authenticate users based on a user name and password entered by the user or other authentication techniques such as digital signatures, certificates, cookies, keys, etc.

In some implementations, the service provider 215 may be configured to provide a web interface with which users may interact with a program controlling use of applications. For example, the service provider 215 may provide an interface with which a requesting user may enter a request to use one or more applications. In another example, the service provider 215 may provide an interface with which a supervisory user may enter a response to a request for permission to use an application from a requesting user (e.g., interface 600 described below with respect to FIG. 6). The service provider 215 also may provide an interface displaying information related to results of a request for access to an application or displaying information that may be useful to a user making a decision on whether or not to grant permission to use an application. The service provider 215 may communicate with the requesting user device 210 and the supervisory user device 215 using any protocol that facilitates communications over network 205. For example, the host 215 may communicate with the user device 210 using the hypertext transfer protocol (HTTP) or the secure hypertext transfer protocol (HTTPS).

The service provider 215 may be configured to communicate with the application access rules data store 220 to store and retrieve information used in controlling execution of applications. The service provider 215 may communicate with the application access rules data store 220 using any appropriate protocol. The service provider 215 may communicate with the application access rules data store 220 over a dedicated connection, a network other than the network 205 (e.g., a local area network of a company implementing the service provider 215 and application access rules data store 220), or the network 205. Although the service provider 215 has been described as a single server or electronic device, the service provider 215 may include any combination of multiple servers, computer systems, or other types of electronic devices configured to execute a program that controls use of applications.

The application access rules data store 220 may include one or more locally or remotely accessible storage devices configured to store information used in executing a program that controls use of applications. The application access rules data store 220 may include one or more storage or memory devices configured to store electronic data. The storage or memory devices may be configured to store data using, for example, magnetic, optical, or solid state technologies. Although the application access rules data store 220 is shown as being separate from the service provider 215, the application access rules data store 220 may be part of the service provider 215.

The application access rules data store 220 may be configured to store information used in processing requests for use of an application. For example, the application access rules data store 220 may store application access rules that may be used by the service provider 215 in processing a request to use an application. In this example, the service provider 215 may access application access rules stored in the application access rules data store 220 to determine whether a requesting user needs permission to execute a program on the requesting user device 210. The application access rules stored in the application access rules data store 220 may include information related to conditions or restrictions on the execution of applications on the requesting user device 210. In some implementations, a supervisory user using the supervisory user device 225 may be able to store or modify application access rules stored in the application access rules data store 220. The application access rules stored in the application access rules data store 220 may be associated with particular users, particular applications, particular types of applications, or some combination thereof.

The supervisory user device 225 may be a general-purpose computer (e.g., a desktop personal computer, a workstation, or a laptop computer) that is configured to communicate with the service provider 215 over the network 205. In some implementations, the supervisory user device 225 may be a mobile device or a device designed for a specific function. For example, the supervisory user device 225 may include a cell phone, a smart phone, a tablet PC, a personal digital assistant ("PDA"), or any other portable device configured to communicate over a network and display information. For example, implementations may also include Blackberry devices, electronic organizers, iPod devices or other portable music players, other communication devices, and handheld or portable electronic devices for gaming, communications, and/or data organization.

The supervisory user device 225 may be configured to exchange communications with the service provider 215 to enable a supervisory user using the supervisory user device 225 to implement control over a requesting user's use of applications. The supervisory user device 225 may be similar to the requesting user device 210. Although FIG. 2 illustrates a single supervisory user device 225 for brevity, actual implementations may include more (and, perhaps, many more) supervisory user devices.

Figure 3:
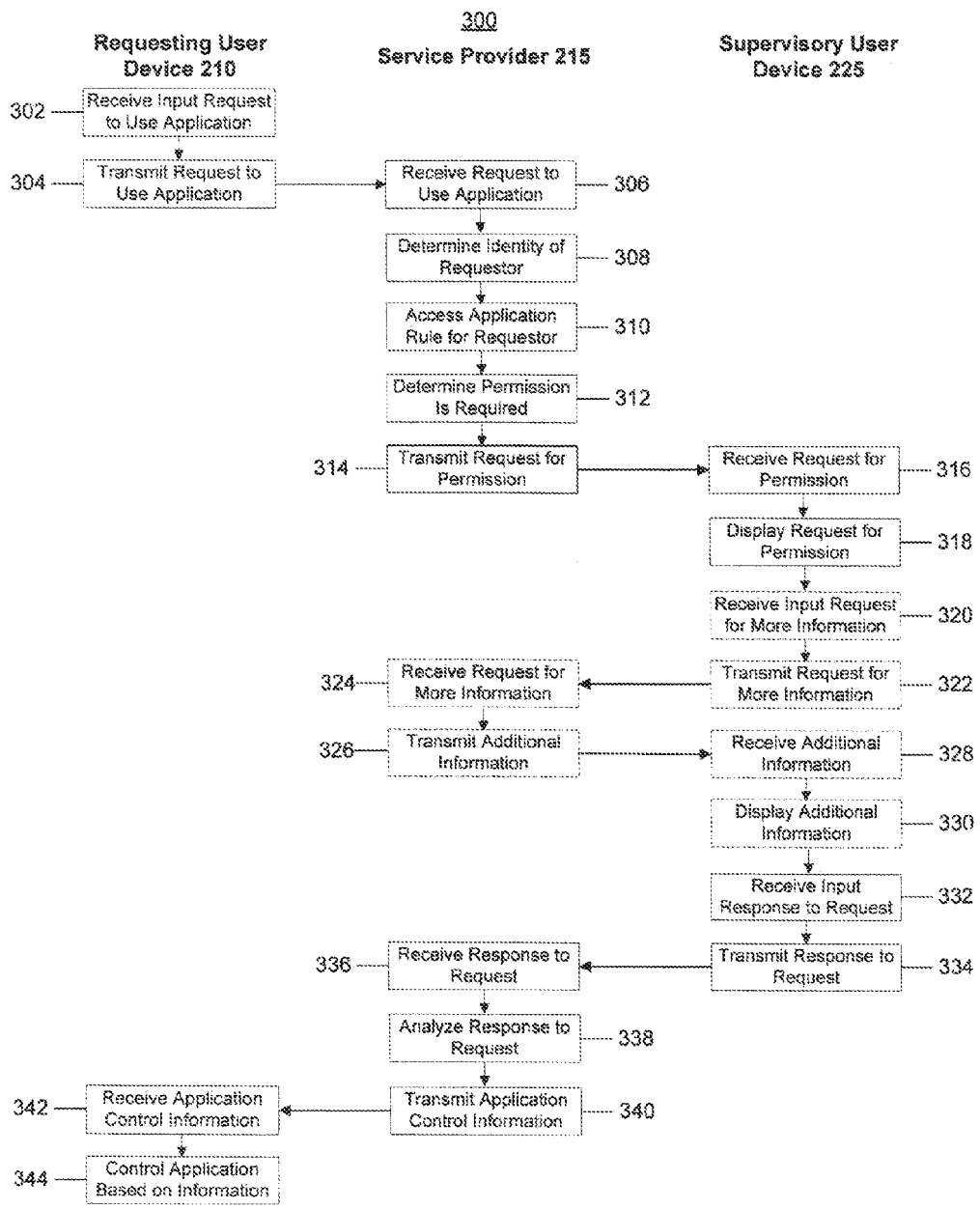
FIG. 3 is a flow chart of a process for controlling use of an application by a requesting user.

FIG. 3 illustrates an example of a process 300 for controlling use of an application by a requesting user. For convenience, particular components described with respect to FIG. 2 are referenced as performing the process 300. However, similar methodologies may be applied in other implementations where different components are used to define the structure of the system, or where the functionality is distributed differently among the components.

The requesting user device 210 receives an input request to use an application (302). In some implementations, the requesting user device 210 may receive user input provided by a requesting user indicating a request to use an application. For example, the requesting user may provide user input to the requesting user device indicating a request to use an application by selecting, with a mouse, an icon that is rendered on a graphical user interface of a display associated with the requesting user device 210 and is configured to initiate execution of (e.g., launch) the application. In another example, the requesting user may enter, using a keyboard, a command into a user interface rendered on a display associated with the requesting user device 210 to execute an application. In some examples, a requesting user may submit a request for permission to use an application by interacting with a user interface rendered on a display associated with the requesting user device 210 (e.g., the interface 400 described below with respect to FIG. 4). In these examples, the request may be unrelated to initiating execution of the application (e.g., submission of the input does not initiate execution of the application).

The request may include additional information added by the requesting user related to processing the request. For example, the request may include information indicating when the requesting user wishes to use the application (e.g., as soon as possible or next week), the supervisory user to whom the requesting user wishes to request permission (e.g., Mom or Dad), the communication method with which the requesting user wishes to request permission (e.g., electronic mail, instant messaging, etc.), and information supplementing the request (e.g., the requesting user may provide a message to the supervisory user asking "May I play the game? I have finished, all of my homework.") The request may be to execute a local application executed solely by the requesting user device 210 or may be a request to access a network-based application. The requesting user device 210 also may receive the input request in an electronic communication from another electronic device.

FIG. 4 illustrates an example of a user interface 400 for initiating an application unlock request. The user interface 400 may be displayed on a display associated with the requesting user device 210 to enable a requesting user to provide user input to the requesting user device 210. The user interface 400 includes an application name portion 405, a users to send portion 410, a communication method portion 420, an extra request information portion 430, a submit interface actionable item 440, and a cancel interface actionable item 450. The application name portion 405 includes a text portion configured to display a name of the application associated with the request. The text portion may include a user input element with which a user may enter or modify the application name displayed in the application name portion 405. For example, the application name portion 405 may include a text box with which a requesting user may enter or modify a name of an application using a keyboard. In another example, the application name portion 405 may include a drop-down menu with which a requesting user may select an application name from a list of available applications. Other types of user input elements may be used to enable a requesting user to enter or modify an application name associated with the request. In some implementations, the name displayed in the application name portion 405 is not modifiable by a requesting user. For example, in implementations in which the user interface 400 is displayed in response to a requesting user attempting to execute an application, the application name portion 405 may automatically display the name of the application the requesting user is attempting to execute and prevent the requesting user from modifying that name.

The user interface 400 also includes a users to send portion 410. The users to send portion 410 includes multiple users 412-416. The multiple users 412-416 each include a text display of a user name and a user input element that enables a user to select a user to send the request for permission to use the application. For example, as shown in the example user interface 400, each of the users 412-416 include a text display of a user name and a check box with which a user may check to select a user. In particular, the user 412 includes a check box associated with a text display of "Mom_User," the user 414 includes a check box associated with a text display of "Dad_User," and the user 416 includes a check box associated with a text display of "Guardian_User." Although the users 412-416 have been described as being associated with check boxes, other implementations may include other user input elements that enable a user to select a user to send the request for permission. For example, the user input elements may include one or more of interface buttons, drop-down menus, radio buttons, interface actionable items, text boxes, etc. The user input elements associated with the users 412-416 may be configured to enable a user to enter only one user to send the request for permission or may be configured to enable a user to enter multiple users to send the request for permission.

In some implementations, the users to send portion 410 may not be provided on the user interface 400. For example, the users to send portion 410 may not be provided in situations in which only one supervisory user exists or in situations in which the supervisory users have selected to prevent the requesting user from selecting to which supervisory user the request is sent. The list of users included in the users to send portion 410 may vary based on a set rules. For example, the list of users may vary based upon known availability of users to respond to requests for permission. In one example, Mom_User may not be displayed in the users to send portion 410 on Monday to Friday between the hours of 9 am to 5 pm because the set of rules indicate that Mom_User will be at work during these hours and unable to respond to the request. In another example, Dad_User may not be included in the users to send portion 410 because Dad_User has a meeting scheduled at the time of the request and will be unable to respond to the request. In this example, calendar information associated with the supervisory users may be accessed to determine the list of users to present in the users to send portion 410.

The user interface 400 also includes a communication method portion 420. The communication method portion 420 includes multiple communication methods 422-428. The multiple communication methods 422-428 each include a text display of a communication method and a user input element that enables a user to select a communication method with which to send the request for permission to use the application. For example, as shown in the example user interface 400, each of the communication methods 422-428 include a text display of a communication method and a check box with which a user may check to select a user. In particular, the communication method 422 includes a check box associated with a text display of "Instant Message," the communication method 424 includes a check box associated with a text display of "E-Mail," the communication method 426 includes a check box associated with a text display of "Website," and the communication method 428 includes a check box associated with a text display of "Text Message." Although the communication methods 422-428 have been described as being associated with check boxes, other implementations may include other user input elements that enable a user to select a communication method with which to send the request for permission. For example, the user input elements may include one or more of interface buttons, drop-down menus, radio buttons, interface actionable items, text boxes, etc. The user input elements associated with the communication methods 422-428 may be configured to enable a user to enter only one communication method with which to send the request for permission or may be configured to enable a user to enter multiple communication methods with which to send the request for permission.

The user interface 400 also includes an extra request information portion 430 that includes an extra request information text box 432. The extra request information text box 432 may be configured to enable a requesting user to add custom information to the request for permission. The custom information may include a note for the supervisory user making a decision on the request. For example, the requesting user may be a child and the child may enter a custom note to a parent indicating that the child has completed all of his or her homework or that the application is needed for a particular reason (e.g., "I need to use a web browser application to access information associated with my class project."). In some implementations, the permission from all of a requesting user's supervisory users may be required to enable the requesting user to use the application. In these implementations, the requesting user may enter custom information in the extra request information text box 432 indicating that one or more other supervisory user's have granted permission to use the application. Other implementations may only require permission from one supervisory user or a majority of the supervisory users. In some examples, the extra request information portion 430 may include, additionally or alternatively to the extra request information text box 432, a drop-down menu with which a requesting user may select extra request information form list of common (or past) extra request information submissions. Other types of user input elements may be used to enable a requesting user to enter or modify extra request information.

The user interface 400 also includes a submit interface actionable item 440 and a cancel interface actionable item 450. The submit interface actionable item 440 may be configured to receive user selection to submit an application unlock request. For example, the submit interface actionable item 440 may be configured to initiate a process that analyzes the information input to the user interface 400 and generates a request to transmit to a service provider configured to process application unlock requests. The cancel interface actionable item 450 may be configured to end the request. In one example, the cancel interface actionable item 450, upon activation, may be configured to clear all of the user input elements included in user interface 400. In another example, the cancel interface actionable item 450, upon activation, may be configured to hide or close the display of the user interface 400 associated with the request.

Referring again to FIG. 3, the requesting user device 210 transmits a request to use the application to the service provider 215 (304). For example, the requesting user device 210 may send a request to use the application to the service provider 215 in an electronic communication over the network 205. The request may include information sufficient for the service provider 215 to process the request. For example, the request may include a name of the user requesting permission and a name of the application the user is requesting to use. The request also may include authentication information used by the service provider 215 to authenticate that the user requesting permission is actually the user listed in the request (e.g., authentication credentials). The request further may include additional information entered by the requesting user, such as the information discussed above with respect to the user interface 400 shown in FIG. 4. In transmitting the request, the requesting user device 210 may perform other processes to assist in controlling use of applications. For example, the requesting user device 210 may delay or temporarily prevent the application from executing to allow for processing of the request for permission. The requesting user device 210 may transmit the request immediately upon receiving the input request or may delay transmission of the request to a later time. In some implementations, the requesting user device 210 may transmit the request to the service provider 215 in a format as received by the requesting user device 210. In other implementations, the requesting user device 210 may perform processing on the input request received by the requesting user device 210 to convert the request to a format appropriate for the service provider 215 prior to transmission.

The service provider 215 receives the request to use the application (306). For example, the service provider 215 may receive the request in an electronic communication sent over the network 205.

The service provider 215 determines an identity of the requesting user (308). For example, the service provider 215 may analyze the request to determine identity information for the requesting user. In one example, the service provider 215 parses the request to extract identity information for the requesting user from the request. In another example, the service provider 215 may access an identifier (e.g., a user identifier or device identifier) from the request and determine identification information for the requesting user based on the identifier. After identifying the requesting user, the service provider 215 may perform an authentication process associated with the identified requesting user to verify that the request is from the identified requesting user. The authentication process may include authenticating the requesting user based on information included in the request, information obtained in a different electronic communication, or a previous authentication occurring before receipt of the request. The service provider 215 also may identify the application to which the user is requesting access and other information associated with the request (e.g., information discussed above with respect to the user interface 400 shown in FIG. 4).

The service provider 215 accesses an application access rule associated with the requesting user (310). For example, the service provider 215 may access, from the application access rule data store 220, an application access rule based on the identity of the requesting user. In some implementations, the application access rule may be associated with the requesting user and include information used in processing a request to use an application by the requesting user. For example, the application access rule may include information identifying one or more supervisory users associated with the requesting user. In this example, all requests to use an application from a requesting user may require permission from a supervisory and the application access rule may be accessed to determine the one or more supervisory users to which to send the request. The application access rule may also identify a communication method with which to send the request to the one or more supervisory users.

In some implementations, the application access rule may include information sufficient to a make a determination of whether permission is required for the user to access the application associated with the request. For example, the application access rule may include information indicating whether permission is needed for requests that have particular properties. In one example, the application access rule may indicate that permission is required based on the type of application the user is requesting to execute (e.g., permission is needed only for applications with a Mature rating or permission is needed only for applications that enable access to the Internet). In another example, the application access rule may indicate that permission is needed when the application request is received during a certain time of day or on certain days of the week (e.g., permission is needed only for requests received after 6 pm or permission is needed only for requests received on Monday through Friday).

The application access rule may be applicable for any application to which the user is requesting access or may be associated with one or more specific applications. In implementations in which the application access rule is associated with one or more specific applications, the requesting user may be associated with multiple application access rules and the service provider 215 may be configured to select one of the multiple application access rules based on the application associated with the request received from the requesting user device 210. In some implementations, the application access rule may be associated with an application and may be used to process a request to use the application regardless of the user that is requesting access. The application access rule may further include restrictions to place on the requesting user's use of the application (e.g., time limits or feature modifications). Implementations may include accessing multiple application access rules. Generic application access rules may be used when the processor is unable to identify a specific application access rule appropriate for the application.

The service provider 215 determines that permission is required for the requesting user to use the application (312). For example, the service provider 215 may analyze the application access rule and determine that permission is required for the requesting user to use the application. In some implementations, the service provider 215 may access information included in the application access rule that indicates that permission is always required when the requesting user attempts to execute the application.

In other implementations, the service provider 215 may access information included in the application access rule that indicates that permission is required if certain conditions are met. In these implementations, the service provider 215 may analyze properties associated with the request to use the application and determine that permission is required because the certain conditions are met. For example, a condition may include a rating of the application or a time of day restriction. In this example, a first request to use an application that has a mature rating may require permission, but a second request to use an application that has a teen rating may not require permission. Further, in this example, a first request to use an application that has instant messaging capability may require permission, but a second request to use an application that does not have instant messaging capability may not require permission. The capabilities of an application may be used to determine a rating for the application and the capabilities rating may be used to determine whether permission is required for an application. In implementations in which permission is not needed, the service provider 215 sends an electronic communication or control signal to the requesting user device 210 to indicate that the requesting user may use the requested application. In some implementations, the requesting user device 210 may store information related to applications for which the user does not need permission to use (or information related to applications for which the user does or sometimes needs permission to use) and only sends a request to the service provider 215 when permission may be needed. In implementations in which permission is needed for all application unlock requests, a separate analysis and determination that permission is needed for each request may not be performed.

FIG. 5 illustrates an example of a data structure 500 used in controlling use of applications. For example, the data structure 500 may include multiple application access rules and may be stored in the application access rule data store 220. In this example, the data structure 500 may be accessed in step 310 shown in FIG. 3 to access an application access rule associated with the requesting user. The data structure 500 includes multiple columns 505-535 (e.g., fields) and multiple rows 540-565 (e.g., records or application access rules). The multiple columns 505-535 may include, for example, a user column 505, a supervisory user column 510, an application type column 515, a permission needed column 520, a time allowed column 525, a days allowed column 530, and a restrictions column 535. In other implementations, the data structure 500 include more columns to store more variables with which to process application unlock requests. The user column 505 stores information identifying a user associated with the record or application access rule. For example, the user column 505 may store a name of a user, a screen or login name of a user, an identifier for a user, or other information that may be used in identifying a user. The information stored in the user column 505 may be used to identify application access rules stored in the data structure 500 that are associated with a user requesting permission to use an application.

The supervisory user column 510 stores information linking one or more supervisory users with the user identified in the user column 505. For example, the supervisory user column 510 may store a name of a supervisory user, a screen or login name of a supervisory user, an identifier for a supervisory user, or other information that may be used in identifying a supervisory user. The service provider 215 may use the information stored in the supervisory user column 510 to identify one or more supervisory users associated with a requesting user to which to send a request for permission received from the requesting user.

The application type column 515 stores information related a type or property associated with an application to which the application access rule applies. For example, the application type column 515 may store information associated with a rating of an application, information identifying a specific application to which the rule applies, or a type (or capability) of an application to which the rule applies. The service provider 215 may use the information stored in the application type column 515 to identify a proper application access rule to apply to a request to use an application. If an application applies to a specific application access rule and an application access rule associated with a type or property of the application, the specific application access rule may apply over the application access rule associated with the type or property.

The permission needed column 520 stores information indicating whether permission is needed for requests to which the application access rule applies. For example, the permission needed column 520 may indicate that permission is never needed for requests associated with the application access rule, may indicate that permission is always needed for requests associated with the application access rule, or may indicate that permission is needed for requests associated with the application access rule only if certain conditions are met. In implementations in which permission is needed for requests associated with the application access rule only if certain conditions are met, other information included in the application access rule may include information related to the conditions.

The time allowed column 525 stores information indicating a time of day with which use of applications associated with the application access rule may be used or may not require permission to use. For example, the time allowed column 525 may store information indicating that use of the application is allowed at any time or that use of the application is allowed only for one or more specific time periods during the day.

The days allowed column 530 stores information indicating a day of the week with which use of applications associated with the application access rule may be used or may not require permission to use. For example, the days allowed column 530 may store information indicating that use of the application is allowed on any day of the week or that use of the application is allowed only for one or more specific days of the week.

The data structure 500 includes example rows 540-565. The row 540 illustrates an example of an application access rule for User1. In particular, the row 540 indicates that the supervisory user associated with this rule is not applicable because permission is never needed for applications associated with this rule. The row 540 includes information indicating that the rule applies to applications that have an Everyone rating. The row 540 also includes information indicating that use of applications associated with the rule are allowed at any time of the day, all days of the week, and should be restricted such that the application is unable to access the Internet. For example, when User1 sends a request to use an application that has an Everyone rating, the service provider 215 accesses the application access rule provided in row 540 and determines that permission from a supervisory user is not needed. Accordingly, the service provider 215 enables User1 to use the application, but applies the restriction that the application is prevented from accessing the Internet.

The row 545 illustrates another example of an application access rule for User1. In particular, the row 545 indicates that the supervisory user associated with this rule is Mom_User and that the rule applies to applications that have a Teen rating. The row 545 includes information indicating that permission is needed only during restricted times (e.g., after 8 p.m. and before 7 a.m.). The row 545 also includes information indicating that use of applications associated with the rule are allowed between 7 a.m. to 8 p.m. for all days of the week without permission. The row 545 further includes information indicating that an application associated with the rule should be restricted such that the application is unable to access the Internet and may only be used for two hours. For example, when User1 sends a request to use an application that has a Teen rating at 2 p.m. on Friday, the service provider 215 accesses the application access rule provided in row 545 and determines that permission from a supervisory user is not needed. Accordingly, the service provider 215 enables User1 to use the application, but applies the restriction that the application is prevented from accessing the Internet and that User1 may use the application for only two hours. In another example, when User1 sends a request to use an application that has a Teen rating at 9 p.m. on Friday, the service provider 215 accesses the application access rule provided in row 545 and determines that permission from a supervisory user is needed. Accordingly, the service provider 215 sends a request for permission to Mom_User and determines whether to enable User1 to use the application based on a response from Mom_User. If Mom_User grants permission to use the application, Mom_User may specify restrictions to impose on the use of the application and those restrictions may apply over the restrictions included in row 545 and may be more, less, or the same as those included in row 545.

The row 550 illustrates another example of an application access rule for User1. In particular, the row 550 indicates that the supervisory user associated with this rule is Dad_User and that the rule applies to applications that have a Mature rating. The row 550 includes information indicating that permission is always needed for applications associated with this rule. The row 550 also includes information indicating that use of applications associated with the rule are allowed between 1 p.m. to 4 p.m. on Saturday and Sunday. The row 550 further includes information indicating that an application associated with the rule should be restricted such that the application does not display blood and censors the language of the application. For example, when User1 sends a request to use an application that has a Mature rating at 2 p.m. on Friday on at 6 p.m. on Saturday, the service provider 215 accesses the application access rule provided in row 550 and determines that use of the applications not allowed at this time because the request has been received on a restricted day or a restricted time of day. Accordingly, the service provider 215 prevents User1 from using the application. In another example, when User1 sends a request to use an application that has a Mature rating at 2 p.m. on Saturday, the service provider 215 accesses the application access rule provided in row 550 and determines that permission from a supervisory user is needed. Accordingly, the service provider 215 sends a request for permission to Dad_User and determines whether to enable User1 to use the application based on a response from Dad_User. If Dad_User grants permission to use the application, the service provider 215 enables User1 to use the application with the restriction that the application does not display blood and censors the language of the application (e.g., prevents a video game related to fighting from displaying blood or bleeps curse words included in a mature song or video).

The row 555 illustrates another example of an application access rule for User1. In particular, the row 555 indicates that the supervisory user associated with this rule is Mom_User and Dad_User and that the rule applies to the Space Zombies application. In this example, both Mom_User and Dad_User may be required to grant permission for User1 to use this application. In addition, the Space Zombies application may have a Mature rating, but the application access rule associated with row 555 is applied instead of the application access rule associated with row 550 because the application access rule associated with row 555 is specific to the application. The row 555 includes information indicating that permission is always needed for the Space Zombies application. The row 555 also includes information indicating that use of the Space Zombies application is allowed between 1 p.m. to 4 p.m. on Saturday and that the Space Zombies application should be restricted such that the application only executes for levels 1-3. For example, when User1 sends a request to use the Space Zombies application at 2 p.m. on Friday on at 6 p.m. on Saturday, the service provider 215 accesses the application access rule provided in row 555 and determines that use of the application is not allowed at this time because the request has been received on a restricted day or a restricted time of day. Accordingly, the service provider 215 prevents User1 from using the Space Zombies application. In another example, when User1 sends a request to use the Space Zombies application at 2 p.m. on Saturday, the service provider 215 accesses the application access rule provided in row 555 and determines that permission from a supervisory user is needed. Accordingly, the service provider 215 sends a request for permission to Mom_User and Dad_User and determines whether to enable User1 to use the Space Zombies application based on a response from Mom_User and Dad_User. If both users grant permission to use the Space Zombies application, the service provider 215 enables User1 to use the Space Zombies, but only for levels 1-3. Other implementations may require that only one of the Mom_User or the Dad_User grant permission to enable use of the application.

The row 560 illustrates another example of an application access rule for User1. In particular, the row 560 indicates that the supervisory user associated with this rule is Mom_User and that the rule applies to applications that have Instant Messaging capability. The row 560 includes information indicating that permission is needed only during restricted times (e.g., after 6 p.m. and before 10 a.m.). The row 560 also includes information indicating that use of applications associated with the rule are allowed between 10 a.m. to 6 p.m. for all days of the week without permission. The row 560 further includes information indicating that an application associated with the rule should be restricted such that the application only allows communication sessions with instant messaging buddies included on an approved list. For example, when User1 sends a request to use an application that has instant messaging capabilities at 2 p.m. on Friday, the service provider 215 accesses the application access rule provided in row 560 and determines that permission from a supervisory user is not needed. Accordingly, the service provider 215 enables User1 to use the application, but applies the restriction that User1 is prevented from engaging in instant messaging communication sessions with buddies other than those on the approved list. In another example, when User1 sends a request to use an application that has instant messaging capabilities at 9 p.m. on Friday, the service provider 215 accesses the application access rule provided in row 560 and determines that permission from a supervisory user is needed. Accordingly, the service provider 215 sends a request for permission to Mom_User and determines whether to enable User1 to use the application based on a response from Mom_User.

The row 565 illustrates another example of an application access rule for User1. In particular, the row 565 indicates that the supervisory user associated with this rule is Guardian_User and that the rule applies to applications that have web browser capability. The row 565 includes information indicating that permission is always needed for applications associated with this rule. The row 565 also includes information indicating that use of applications associated with the rule are allowed between 10 a.m. to 6 p.m. on all days of the week. The row 565 further includes information indicating that an application associated with the rule should be restricted such that the application does not allow access to web sites that include adult content or chat rooms. For example, when User1 sends a request to use an application that has web browser capability at 8 p.m. on Friday, the service provider 215 accesses the application access rule provided in row 565 and determines that use of the application is not allowed at this time because the request has been received at a restricted time of day. Accordingly, the service provider 215 prevents User1 from using the application. In another example, when User1 sends a request to use an application that has web browser capability at 2 p.m. on Saturday, the service provider 215 accesses the application access rule provided in row 565 and determines that permission from a supervisory user is needed. Accordingly, the service provider 215 sends a request for permission to Guardian_User and determines whether to enable User1 to use the application based on a response from Guardian_User. If Guardian_User grants permission to use the application, the service provider 215 enables User1 to use the application with the restriction that the application does not allow access to web sites that include adult content or chat rooms.

Although each of the example rows 540-565 are associated with a single user (i.e. User1), many more rows may be included that are associated with other users.

Referring again to FIG. 3, the service provider 215 transmits a request for permission to the supervisory user device 225 (314). For example, the service provider 215 may transmit a request for permission to the supervisory user device 225 in an electronic communication over the network 205. The service provider 215 may determine to transmit the request to the supervisory user device 225 based on information included in the request received from the requesting user device 210 or the application access rule indicating that the supervisory user associated with the supervisory user device 225 is an appropriate supervisory user for the request.

The request for permission may include information sufficient to enable the supervisory user to respond to the request. For example, the request for permission may include identity information for the requesting user (e.g., a user name) and application information related to the application (e.g., an application name) that the requesting user wishes to use. The identity information for the requesting user may include a user's real name or the user's screen name or login name. The application information related to the application may include information in addition to the name of the application, such as a summary of the application, a rating for the application, or a capabilities listing for the application. Other information added by the user (e.g., the extra request information described with respect to FIG. 4) or other information added by the service provider 215 that may be pertinent to a decision on whether to grant or deny the request for permission to use the application may be included in the request. The service provider 215 may generate and send the request as an electronic mail message, an instant message, a text message, a phone message, a fax message, or another type of electronic message to the supervisory user device 225. In some implementations, the service provider 225 may determine the communication method with which to send the request to the supervisory user device 225 based on information included in the request received from the requesting user device 210 or the application access rule. In some examples, the request for permission may be sent to the supervisory user device 255 in response to the supervisory user device 255 requesting the request for permission. For example, the request for permission may be sent, by the service provider 215, to the supervisory user device 225 as part of a web page used for application access control when the supervisory user requests access to the web page.

The supervisory user device 225 receives the request for permission (316) and displays the request for permission (318). For example, the supervisory user device 225 receives the request for permission from the service provider 215 as an electronic communication over the network 205. In this example, the supervisory user device 225 uses the information included in the electronic communication to render a display of the request for permission on a display associated with the supervisory user device 225.

Figure 6:
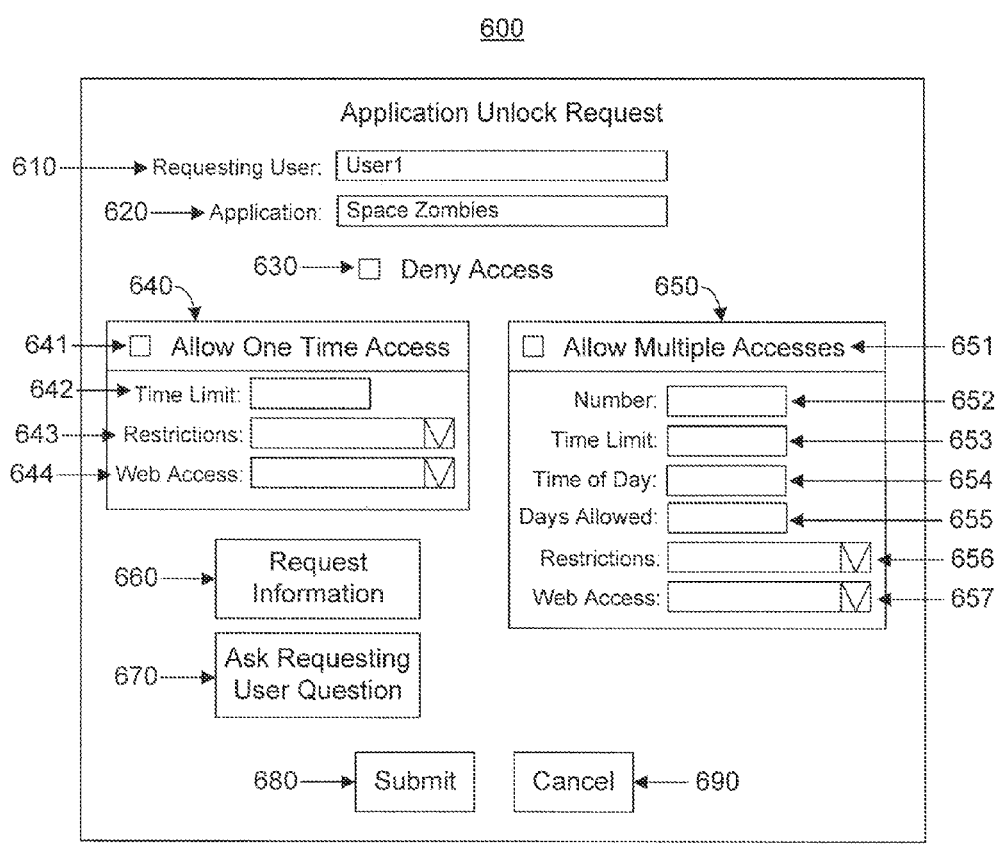
FIG. 6 illustrates an example of a user interface for responding to an application unlock request.

FIG. 6 illustrates an example of a user interface 600 for responding to an application unlock request. The user interface 600 may be displayed on a display associated with the supervisory user device 225 in response to the supervisory user device 225 receiving a request for permission from the service provider 215. In some implementations, the user interface 600 may be displayed on a display associated with the supervisory user device 225 without receiving a request for permission (e.g., a supervisory user may set application access rules without receiving a request from a user to do so). The user interface 600 includes a requesting user name portion 610, an application name portion 620, a deny access portion 630, an allow one time access portion 640, an allow multiple accesses portion 650, a request information interface actionable item 660, an ask requesting user question interface actionable item 670, a submit interface actionable item 680, and a cancel interface actionable item 690.

The requesting user name portion 610 includes a text portion configured to display a name of the requesting user associated with the request. In some implementations, the name displayed in the requesting user name portion 610 is not modifiable by a supervisory user. For example, in implementations in which the user interface 600 is displayed in response to receiving a request for permission, the requesting user name portion 610 may automatically display the name of the requesting user associated with the request for permission and prevent the supervisory user from modifying that name. In implementations in which the user interface 600 has been displayed without receiving a request for permission, the text portion may include a user input element with which a supervisory user may enter or modify the requesting user name displayed in the requesting user name portion 610. For example, the requesting user name portion 610 may include a text box with which a supervisory user may enter or modify a name of a requesting user using a keyboard. In another example, the requesting user name portion 610 may include a drop-down menu with which a supervisory user may select a requesting user name from a list of available names. Other types of user input elements may be used to enable a supervisory user to enter or modify an requesting user name. Supervisory users may be able to set application access rules for multiple users at a single time.

The application name portion 620 includes a text portion configured to display a name of the application associated with the request. In some implementations, the name displayed in the application name portion 620 is not modifiable by a supervisory user. For example, in implementations in which the user interface 600 is displayed in response to receiving a request for permission, the application name portion 620 may automatically display the name of the application associated with the request for permission and prevent the supervisory user from modifying that name. In implementations in which the user interface 600 has been displayed without receiving a request for permission, the text portion may include a user input element with which a supervisory user may enter or modify the application name displayed in the application name portion 620. For example, the application name portion 620 may include a text box with which a supervisory user may enter or modify a name of an application using a keyboard. In another example, the application name portion 620 may include a drop-down menu with which a supervisory user may select an application name from a list of available applications. Other types of user input elements may be used to enable a supervisory user to enter or modify an application name.

The deny access portion 630 includes a user input element configured to enable a supervisory user to select to deny access to the application and a text display identifying the user input element. For example, as shown in the example user interface 600, the deny access portion 630 includes a text display of "Deny Access" and a check box with which a user may check to select to deny access. Although the deny access portion 630 has been described as being associated with a check box, other implementations may include other user input elements that enable a user to select an option. For example, the user input elements may include one or more of interface buttons, drop-down menus, radio buttons, interface actionable items, text boxes, etc.

The allow one time access portion 640 includes an allow one time access control 641, a time limit portion 642, a restrictions portion 643, and a web access portion 644. The allow one time access control 641 is similar to the deny access portion 630 except that selection of the check box included in the allow one time access control 641 enables a requesting user to execute the application one time rather than denying the requesting user access to the application. The time limit portion 642, the restrictions portion 643, and the web access portion 644 enable a supervisory user to include limitations or conditions in allowing a requesting user to execute the application. The time limit portion 642 includes a text box with which a user may enter a time limit to associate with a decision to allow a requesting user a single use of the application. For example, the supervisory user may allow the requesting user to use the application one time, but only for a certain time period (e.g., one hour). The restriction portion 643 includes a drop-down menu with which a user may enter a restriction to associate with a decision to allow a requesting user a single use of the application. The drop-down menu may include a list of possible restrictions a supervisory user may place on a request and may include a custom portion with which a supervisory user may set a custom restriction. For example, a supervisory user may select to censor language of the application associated with the request using the drop-down menu provided in the restrictions portion 643. The list of possible restrictions included in the drop-down menu may vary based on the application associated with the request (e.g., the drop-down menu included in the restrictions portion 643 may not include a restriction to censor language if the application has no inappropriate language or may not be provided in the user interface 600 if no restrictions are available for the application). The web access portion 644 includes a drop-down menu with which a user may enter a web access restriction to associate with a decision to allow a requesting user a single use of the application. The drop-down menu may include a list of possible web access restrictions (e.g., no web access, no adult sites, no chat rooms, etc.). Other implementations may include other user input elements than those discussed with respect to the allow one time access portion 640 and the allow one time access portion 640 may include other options or limitations to place on a response to a request for permission. The supervisory user need not place limitations or conditions on a response to allow a requesting user to use an application.

The allow multiple accesses portion 650 includes an allow multiple accesses control 651, a number of accesses portion 652, a time limit portion 653, a time of day portion 654, a days allowed portion 655, a restrictions portion 656, and a web access portion 657. The allow multiple accesses control 651 is similar to the allow one time access control 641 and the deny access portion 630 except that selection of the check box included in the allow multiple accesses control 651 enables a requesting user to execute the application multiple times. In some implementations, the allow multiple accesses portion 651 may be configured to store or modify application access rules used by the service provider 215. A supervisory user may be able to select only one of the allow multiple accesses control 651, the allow one time access control 641, and the deny access portion 630. The number of accesses portion 652, the time limit portion 653, the time of day portion 654, the days allowed portion 655, the restrictions portion 656, and the web access portion 657 enable a supervisory user to include limitations or conditions in allowing a requesting user to execute the application.

The time limit portion 651, the restrictions portion 656, and the web access portion 657 maybe similar lo the time limit portion 642, the restrictions portion 643, and the web access portion 644 described above.

The number of accesses portion 652 includes a text box with which a user may enter a number of accesses to associate with a decision to allow a requesting user multiple uses of the application. For example, the supervisory user may allow the requesting user to use the application multiple times, but only for a certain number of times (e.g., 5). The time of day portion 654 includes a text box with which a user may enter a time of day to associate with a decision to allow a requesting user multiple uses of the application. For example, the supervisory user may allow the requesting user to use the application multiple times, but only during certain times of the day (e.g., 9 a.m. to 8 p.m.). The days allowed portion 655 includes a text box with which a user may enter days allowed to associate with a decision to allow a requesting user multiple uses of the application. For example, the supervisory user may allow the requesting user to use the application multiple times, but only on certain days or dates (e.g., Saturday and Sunday or July 1 through August 20). Other implementations may include other user input elements than those discussed with respect to the allow multiple accesses portion 650 and the allow multiple accesses portion 650 may include other options or limitations to place on a response to a request for permission. The supervisory user need not place limitations or conditions on a response to allow a requesting user to use an application.

The user interface 600 also includes a request information interface actionable item 660 and an ask requesting user question interface actionable item 670. The request information interface actionable item 660 may be configured to receive user selection to request more information related to the application unlock request. For example, the request information interface actionable item 660 may be configured to initiate a process that sends a request for more information to a service provider. The ask requesting user question interface actionable item 670 may be configured to receive user selection to ask the requesting user a question related to the application unlock request. For example, the ask requesting user question interface actionable item 670 may be configured to initiate a process that displays a user interface with which the supervisory user may use to enter a question for the requesting and sends the question to the requesting user in response to the supervisory user entering the question.

The user interface 600 further includes a submit interface actionable item 680 and a cancel interface actionable item 690. The submit interface actionable item 680 may be configured to receive user selection to submit a response to an application unlock request (e.g., a request for permission to use an application). For example, the submit interface actionable item 680 may be configured to initiate a process that analyzes the information input to the user interface 600 and generates a response to a request for permission to transmit to a service provider configured to process application unlock requests. The cancel interface actionable item 690 maybe configured to end the response to the request for permission. In one example, the cancel interface actionable item 690, upon activation, may be configured to clear all of the user input elements included in the user interface 600. In another example, the cancel interface actionable item 690, upon activation, may be configured to hide or close the display of the user interface 600 associated with the request.

Referring again to FIG. 3, in some implementations, a supervisory user may request more information related to the request for permission to use the application. In these implementations, steps 320-330 of process 300 are performed. These steps are optional as indicated by the dotted lines representing the steps.

The supervisory user device 225 receives an input request for more information (320). For example, the supervisory user device 225 may receive user input from a supervisory user requesting more information related to a request for permission displayed on the supervisory user device 225. In this example, the supervisory user device 225 may receive a selection of the request information interface actionable item 660 provided in user interface 600 described with respect to FIG. 6.

In response to receiving an input request for more information, the supervisory user device 225 transmits a request for more information to the service provider 225 (322). For example, the supervisory user device 225 may transmit a request for more information to the service provider 215 in an electronic communication over the network 205. The request for more information may include information sufficient to enable the service provider 215 to determine additional information related to the request. For example, the request for more information may include identity information for the requesting user (e.g., a user name), identity information for the supervisory user (e.g., a user name), and application information related to the application (e.g., an application name) that the requesting user wishes to use. The request for more information may include identifiers that enable the service provider 215 to determine the relevant information associated with the request.

The service provider 215 receives the request for more information (324). For example, the service provider 215 receives the request for more information from the supervisory user device 225 as an electronic communication over the network 205. In this example, the service provider 215 uses the information included in the electronic communication to determine additional information associated with the request.

The service provider 215 transmits additional information to the supervisory user device 225 (326). For example, the service provider 215 may transmit additional information to the supervisory user device 225 in an electronic communication over the network 205. The additional information may include a rating for the application, one or more capabilities of the application, a summary of the application, current usage by the requesting user of other applications or an electronic device, permission decisions of other supervisory users in similar situations, or any other information that may assist a supervisory user in making a decision on the request for permission. The service provider 215 may obtain the additional information from a variety of sources. For example, the service provider 215 may access the additional information from electronic storage associated with the service provider 215, may receive the additional information in electronic communications with the requesting user device 210, or may receive the additional information in electronic communications with other providers of information associated with applications.

The supervisory user device 225 receives the additional information (328) and displays the additional information (330). For example, the supervisory user device 225 receives the additional information from the service provider 215 in an electronic communication over the network 205. In this example, the supervisory user device 225 uses the information included in the electronic communication to render a display of the additional information on a display associated with the supervisory user device 225. The additional information may be rendered in a display separate from the display of the request for permission or may be included in the display for the request for permission.

Figure 7:
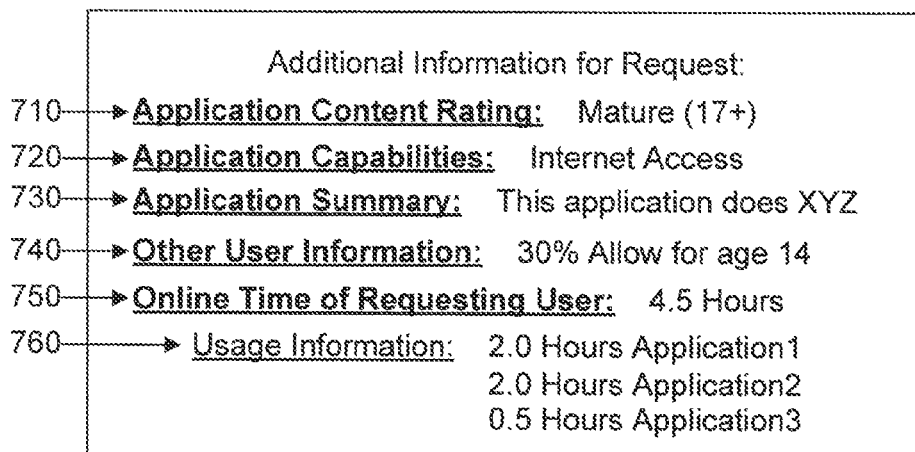
FIG. 7 illustrates an example of a user interface for presenting additional information related to an application unlock request.

FIG. 7 illustrates an example of a user interface 700 for presenting additional information related to an application unlock request. The user interface 700 may be displayed on a display associated with the supervisory user device 225 in response to the supervisory user device 225 receiving additional information from the service provider 215. In some implementations, the user interface 700 may be displayed on a display associated with the supervisory user device 225 without receiving the additional information from the service provider 215 (e.g., the supervisory user device 215 may store the additional information or may receive the information directly from other sources).

The user interface 700 includes an application content rating portion 710, an application capabilities portion 720, an application summary portion 730, an other user information portion 740, an online time of requesting user portion 750, and a specific usage information portion 760. The application content rating portion 710 includes a text display of an application content rating of the application associated with the request for permission. For example, as shown in FIG. 7, the application content rating of the application is Mature (17+). The rating may suggest a recommended age appropriateness for the application and categorize the application with regard to suitability for users in terms of issues such as sex, violence, and profanity.

An application capabilities portion 720 may include a text display of the capabilities of the application associated with the request for permission. For example, as shown in FIG. 7, the listed capabilities indicate that the application is capable of Internet access. The listed capabilities may include some or all of the capabilities of the application. In implementations in which the listed capabilities are less than all of the capabilities, the listed capabilities may include those capabilities determined to be most dangerous. In some implementations, the application capabilities portion 720 includes a rating for the application based on the capabilities. For example, the rating may provide an indication of an aggregate of the total capabilities possible from the application rather than focusing on the specific capabilities. In this example, a first application that has Internet access capabilities and instant messaging capabilities may have a higher (more dangerous) rating than a second application that has only instant messaging capabilities.

The application summary portion 730 may include a text display of a summary of the application associated with the request for permission. For example, as shown in FIG. 7, the application summary lists that "This application does XYZ." The application summary portion 730 also may include a graphical display (e.g., pictures) or a demonstration of the application.

The other user information portion 740 may include information related to application unlock decisions made by supervisory users in a similar situation. For example, as shown in FIG. 7, the other user information lists that "30% Allow for age 14." This information provides the supervisory user with information indicating that 30% of supervisory users have allowed access to the application for a 14 year old requesting user in response the 14 year old requesting user requesting permission to use the application. The other user information may be tailored to the requesting user based on the age of the requesting user, the geographic regions of the requesting user, or a social network or group associated with the requesting user. The other user information portion 740 also may include comments or reviews submitted by other supervisory users who are familiar with the application.

The online time of requesting user portion 750 may include information related to the time with which the requesting user has been connected to the service provider 215. For example, as shown in FIG. 7, the online time of the requesting user has been "4.5 Hours." The online time of requesting user portion 750 may represent the time with which the requesting user has been connected to the service provider 215 or may represent the time with which the requesting user has been using the requesting user device 210 (e.g., the time the device has been turned on or the time elapsed without the requesting user device entering a sleep or idle mode). The online time of the requesting user may be useful to the supervisory user in determining whether to grant the requesting user permission to use the application.

The specific usage information portion 760 may include information related to the specific applications that the requesting user has been using on the requesting user device 210. For example, as shown in FIG. 7, the specific usage information may indicate that the requesting user has been using Application1 for 2.0 Hours, Application2 for 2.0 Hours, and Application3 for 0.5 Hours. The specific usage information for the requesting user may be useful to the supervisory user in determining whether to grant the requesting user permission to use the application. For example, if Application1 and Application2 are applications directed to assisting the requesting user in completing a homework assignment the supervisory user may be more likely to grant a request to use a game application than if Application1 and Application2 are game applications.

In other implementations, the supervisory user may gain additional information by using the supervisory user device 225 to ask a question to the requesting user in addition to or instead of requesting more information. In these implementations, the supervisory user may identify a question (e.g., select a question from a list of questions or enter a custom question) using the supervisory user device 225 and the supervisory user device 225 may send the question to the service provider 215. The service provider 215 may facilitate the exchange of the question from the supervisory user to the requesting user and an answer to the question from the requesting user to the supervisory user. In some implementations, the service provider 215 may establish a real-time communication session (e.g., an instant messaging communication session) between the supervisory user and the requesting user to facilitate the exchange of multiple questions and answers related to the request for permission to use the application. A supervisory user may provide user input to the supervisory user device 225 to ask a question to the requesting user. For example, the supervisory use may select the ask requesting user question interface actionable item 670 included in the user interface 600 shown in FIG. 6 when the user interface 600 is displayed on a display associated with the supervisory user device 225. In this example, in response to the supervisory user selecting the ask requesting user question interface actionable item 670, a user interface configured to enable the supervisory to enter a question, such as the user interface shown in FIG. 8, may be displayed.

Figure 8:
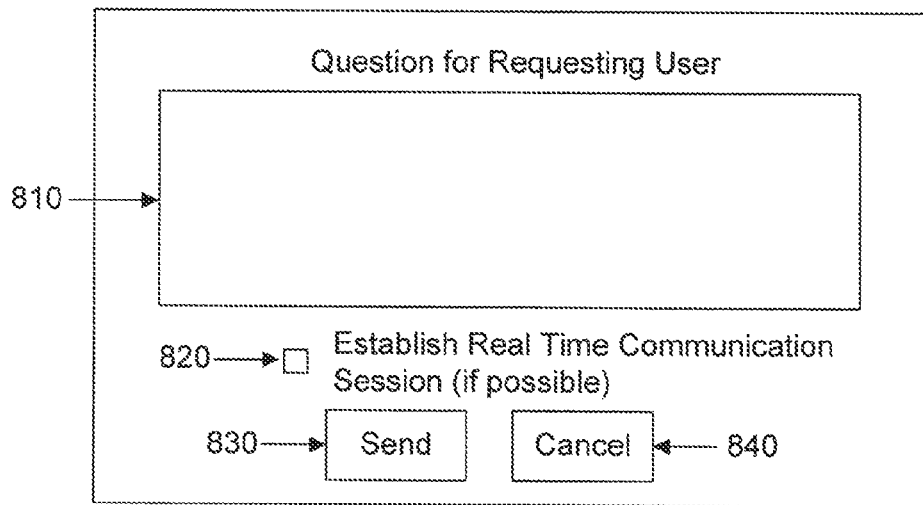
FIG. 8 illustrates an example of a user interface for sending a question to a requesting user in response to receiving an application unlock request initiated by the requesting user.

FIG. 8 illustrates an example of a user interface 800 for sending a question to a requesting user in response to receiving an application unlock request initiated by the requesting user. The user interface 800 may be displayed in response to a supervisory user selecting the ask requesting user question interface actionable item 670 included in the user interface 600 shown in FIG. 6. The user interface 800 includes a question portion 810, an establish real-time communication session portion 820, a send interface actionable item 830, and a cancel interface actionable item 840.

The question portion 810 includes a question text box. The question text box may be configured to enable a supervisory user to enter a custom question for a requesting user. The custom information may include a note for the requesting user requesting permission to use the application. For example, the requesting user may be a child, the supervisory user may be a parent, and the parent may enter a custom note to the child asking the child if he or she has completed all of his or her homework or asking the child if there is a reason the child needs to use the application. In some examples, the question portion 810 may include, additionally or alternatively to the question text box, a drop-down menu with which a supervisory user may select a question from list of common (or past) questions. Other types of user input elements may be used to enable a supervisory user to enter or modify a question.

The establish real-time communication session portion 820 includes a user input element configured to enable a supervisory user to select to establish a real-time communication session and a text display identifying the user input element. For example, as shown in the example user interface 800, the establish real-time communication session portion 820 includes a text display of "Establish Real Time Communication Session (if possible)" and a check box with which a user may check to select to establish a real-time communication session. Although the establish real-time communication session portion 820 has been described as being associated with a check box, other implementations may include other user input elements that enable a user to select an option. For example, the user input elements may include one or more of interface buttons, drop-down menus, radio buttons, interface actionable items, text boxes, etc.

The user interface 800 includes a send interface actionable item 830 and a cancel interface actionable item 840. The send interface actionable item 830 may be configured to receive user selection to send a question to the requesting user (e.g., send a question to service provider 215 for routing to the requesting user device 210 or send the question directly to the requesting user device 210). For example, the send interface actionable item 830 may be configured to initiate a process that analyzes the information input to user interface 800 and generates a question to transmit to a requesting user device. In an example in which the check box associated with the establish real-time communication session portion 820 is checked when the send interface actionable item is selected, the send interface actionable item 830 may be configured to initiate a process that attempts to establish a real-time communication session between the supervisory user and the requesting user. For example, the service provider 215 may establish an instant messaging communication session between the supervisory user and the requesting user if the service provider 215 detects online presence for both users. The question entered in the question portion 810 may be used as the first message in the real-time communication session. The cancel interface actionable item 840 may be configured to end the question sending. In one example, the cancel interface actionable item 840, upon activation, may be configured to clear all of the user input elements included in user interface 800. In another example, the cancel interface actionable item 840, upon activation, may be configured to hide or close the display of the user interface 800 associated with the request.

Referring again to FIG. 3, the supervisory user device 225 receives an input response to the request for permission (332). For example, the supervisory user device 225 may receive user input from a supervisory user indicating a response to a request for permission displayed on the supervisory user device 225. In this example, the supervisory user device 225 may receive a response from the supervisory user entered into the user interface 600 described with respect to FIG. 6. The input response may be provided by the supervisory user after the supervisory user has been informed of additional information related to the request for permission to use the application or after exchanging one or more messages with the requesting user.

In response to receiving an input response to the request for permission, the supervisory user device 225 transmits the response to the service provider 225 (334). For example, the supervisory user device 225 may transmit the response to the service provider 215 in an electronic communication over the network 205. The response may include authorization information with which the service provide 215 may use to determine whether the supervisory user has granted permission for the requesting user to use the application. In some implementations, the response includes information indicating whether or not the supervisory user has given the requesting user permission to use the application. The response may include information sufficient to enable the service provider 215 to handle the request to use the application from the requesting user. For example, the response may include identification information for the requesting user, identification information for the application, and authorization information indicating whether or not the supervisory user approves the request.

In some implementations, the response may grant permission, but include conditions or restrictions on the requesting user's use of the application. The conditions or restrictions may include one or more of a time limit for use of the application, a limit on a number of times the application may be executed, a time of day restriction, a day or date restriction, a restriction on network access by the application, a restriction on the content provided by the application (e.g., censor language, violence, sexual content, etc.), and a restriction on features of the application (e.g., eliminate instant messaging or chat features of the application). In some implementations, the response may indicate permission of the supervisory user for a single use of the application by the requesting user. For example, the response may indicate that the supervisory user either grants or denies permission for the requesting user to use the application on the single occasion associated with the request and permission of the supervisory user is needed for future uses of the application. In other implementations, the response may indicate permission of the supervisory user for future uses (e.g., a certain number of uses or unlimited future uses) of the application by the requesting user. For example, the response may indicate that the requesting user has permission to use the application on future occasions without requesting permission from the supervisory user. In some implementations, the response may include authentication information sufficient to reasonably ensure that the response is from the supervisory user. For example, the response may include authentication credentials or an authentication token, may be encrypted with a specific key, or may be transmitted over a secure channel from a known device.

The service provider 215 receives the response to the request for permission to use the application (336). For example, the service provider 215 receives the response from the supervisory user device 225 as an electronic communication over the network 205. In this example, the service provider 215 uses the information included in the electronic communication to analyze the response to the request.

The service provider 215 analyzes the response to the request (338). For example, the service provider 215 electronically analyzes the response to the request for permission to determine whether the supervisory grants the requesting user permission to use the application. The service provider 215 may analyze authorization information included in the response to determine whether the supervisory user has granted permission for the requesting user to use the application. For example, the service provider 215 may extract the authorization information from the response and compare the authorization information to known responses to identify the response of the supervisory user. In some implementations, receipt of the response alone may be sufficient for the service provider 215 to determine whether or not the supervisory user has given the requesting user permission to use the application (e.g., the system is configured such that the supervisory user device 225 only sends a response when the supervisory user grants permission).

In some implementations, the service provider 215 analyzes the response to determine whether the supervisory user has placed any conditions or restrictions on the use of the application. In these implementations, the service provider 215 identifies the desired restrictions or conditions and applies them to the request. The service provider 215 may determine whether the response indicates permission of the supervisory user for a single use of the application by the requesting user or for multiple uses of the application. In examples in which the response indicates permission for multiples uses, the service provider 215 may update the application access rule for the requesting user stored in the application access rule data store 220 such that future requests for permission may be handled (e.g., granted or denied) without requesting permission from the supervisory user. In some implementations, the service provider 215 analyzes the response to determine whether the response includes authentication information for the supervisory user and, if so, determines whether or not to authenticate the response. In implementations in which the response does not include authentication information, the service provider 215 may request authentication information from the supervisory user or otherwise verify authentication of the supervisory user. For example, the service provider 215 may use a prior authentication of the supervisory user to authenticate the supervisory user.

The service provider 215 transmits application control information to the requesting user device 210 based on the analysis of the response to the request (340). For example, the service provider 215 transmits application control information to the requesting user device 210 in an electronic communication over the network 205. The application control information may include information indicating whether or not to allow the requesting user to use the application included in the request sent from the requesting user device 215. The application control information may include information determined by the service provider 215 based on the response to the request received from the supervisory user device 225. For example, the application control information may include information indicating that the supervisory user denied the requesting user permission to use the application or information indicating that the supervisory user granted the requesting user permission to use the application. In other examples, the application control information may include information providing an instruction of whether or not the requesting user device 210 is to allow the requesting user to use the application without providing an indication of a decision by the supervisory user.

In some implementations, the application control information includes information associated with restrictions or conditions to place on the use of the application. For example, the application control information may include information indicating that the use of the application should be time limited, feature limited, censored, or otherwise restricted.

The requesting user device 210 receives the application control information (342) and controls the application based on the application control information (344). For example, the requesting user device 210 may receive the application control information in an electronic communication sent by the service provider 215 over the network 205. In some implementations, the requesting user device 210 may analyze the application control information and make a determination of how to control the application requested by the user based on the analysis of the application control information. For example, if the requesting user device 210 determines that the application control information indicates that the supervisory user has given the requesting user permission to use the application, the requesting user device 210 enables or allows the application to execute. In another example, if the requesting user device 210 determines that the application control information indicates that the supervisory user has denied the requesting user permission to use the application, the requesting user device 210 prevents the application from executing. In other implementations, the requesting user device 210 receives a control signal and controls execution of the application based on the control signal.

The requesting user device 210 may process the application control information in a variety of manners to control execution of the application. For example, the application itself may process the application control information to control execution of the application. In another example, a separate process running on the requesting user device 210 may process the electronic communication to control execution of the application. The application or the separate process running on the requesting user device 210 may be associated with a process being executed by the service provider 215.

In some implementations, the requesting user device 210 may determine that the application control information includes information identifying one or more restrictions or conditions to place on the use of the application. In these implementations, the requesting user device 210 may handle the request by enabling the requesting user to use the application with the identified restrictions or conditions. For example, the requesting user device 210 may configure the application to execute in accordance with the restrictions or conditions. In this example, the requesting user device 210 may configure the application to execute without displaying blood or censoring curse words used by characters in the application. In another example, the requesting user device 210 may enable the application to execute for only a limited amount of time (e.g., one hour) after receiving the application control information. In other examples, the service provider 215 may monitor conditions or restrictions applied to execution of the application and provide instructions to the requesting user device 210 based on the monitored restrictions or conditions. For example, the service provider 215 may be configured to monitor the time with which the requesting user has been using an application and, when the service provider 215 determines that a time limit has been reached, the service provider 215 may send an electronic communication to the requesting user device 210 to cause the requesting user device 210 to stop execution of the application.

In some implementations, the requesting user device 210 may perform authentication of the application control information received from the service provider 215. For example, the application control information may include authentication information or authentication information may be received by the requesting user device 210 in another communication. The authentication information may include credentials or a token that the requesting user device 210 may use to verify that the application control information is sent from a valid source. In some examples, the requesting user device 210 may perform authentication by determining whether the application control information has been encrypted with a particular key or whether the application control information was received over a secure communication channel. If the requesting user device 210 determines that the application control information is authentic, the requesting user device 210 handles the request to use the application based on the application control information. If the requesting user device 210 determines that the application control information is not authentic, the requesting user device 210 may ignore the application control information and continue to wait for authentic information or may deny the request to use the application in response to determining that the application control information is not authentic. The requesting user device 210 may send an electronic communication to the device (e.g., service provider 215) sending the application control information indicating that the information is or is not authentic.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method for controlling access to an application, the method comprising the following operations performed by one or more processors:
   receiving a first request to use an application, the first request being initiated by a first user;
   accessing, from a database, an application access rule based on an identity of the first user;
   determining that permission is required for the first user to use the application based on the accessed application access rule;
   in response to determining that permission is required for the first user to use the application, sending a second request to a second user requesting permission for the first user to use the application;
   providing, to the second user, information related to the percentage of other users that have granted or denied permission to use the application for a person approximately the same age as the first user:
   receiving a response to the second request from the second user, the response including a restriction on a time of use for the application; and
   in response to receiving the response to the second request from the second user, enabling the first user to use the application for a period of time specified in the restriction on the time of use for the application.

2. The computer-implemented method of claim 1 wherein receiving a first request to use an application includes receiving a first request, over a network, from a remote client device, the first request being a request to use an application executed locally by the remote client device.

3. The computer-implemented method of claim 1 wherein receiving a first request to use an application includes receiving a first request, over a network, from a remote client device, the first request being a request to use an application hosted by a remote server.

4. The computer-implemented method of claim 1 wherein:
   the restriction on a time of use for the application specifies a time of day during which the application may be used; and
   enabling the first user to use the application for a period of time specified in the restriction on the time of use for the application comprises enabling the first user to use the application during the specified time of day.

5. The computer-implemented method of claim 1 wherein:
   the restriction on a time of use for the application specifies an amount of time for which the application may be used; and
   enabling the first user to use the application for a period of time specified in the restriction on the time of use for the application comprises enabling the first user to use the application for the specified amount of time beginning when the response to the second request is received.

6. The computer-implemented method of claim 1 wherein:
   the application access rule includes restrictions on use of the application; and
   enabling the first user to use the application includes enabling the first user to use the application with the restrictions included in the application access rule.

7. The computer-implemented method of claim 6 wherein the restrictions included in the application access rule include one or more of a restriction of a number of executions of the application, a restriction on network access allowed for the application, a restriction on the content provided by the application, and a restriction on the features available in executing the application.

8. The computer-implemented method of claim 1 further comprising:
   updating the application access rule associated with the first user based on the response to the second request from the second user,
   wherein updating the application access rule includes updating the application access rule such that the user does not require permission to use the application in response to future requests to use the application initiated by the first user.

9. The computer-implemented method of claim 1 further comprising:
   updating the application access rule associated with the first user based on the response to the second request from the second user,
   wherein updating the application access rule includes updating the application access rule such that the user does not require permission to use the application in response to future requests to use the application initiated by the first user conditioned on the request being made at a particular time of day.

10. The computer-implemented method of claim 1 further comprising:
    updating the application access rule associated with the first user based on the response to the second request from the second user,
    wherein updating the application access rule includes updating the application access rule such that the user does not require permission to use the application in response to a limited number of future requests to use the application initiated by the first user.

11. The computer-implemented method of claim 1 further comprising:
    receiving a third request from the second user for additional information related the first request to use the application; and
    sending a response to the third request to the second user, the response to the third request including additional information related to the first request to use the application,
    wherein receiving the third request from the second user and sending the response to the third request to the second user are performed prior to receiving the response to the second request from the second user.

12. The computer-implemented method of claim 1 further comprising:
    receiving, from the second user, a third request to send a question to the first user, the third request including a question from the second user and being sent by the second user in response to the second user receiving the second request;
    sending, to the first user, the question from the second user;
    receiving, from the first user, an answer to the question; and
    sending, to the second user, the answer to the question,
    wherein receiving the third request, sending the question, receiving the answer, and sending the answer are performed prior to receiving the response to the second request from the second user.

13. The computer-implemented method of claim 1 wherein:
    the first request to use the application includes information identifying a communication method with which to contact the second user, and
    sending the second request to the second user requesting permission for the first user to use the application includes sending the second request to the second user using the communication method identified in the first request to use the application.

14. The computer-implemented method of claim 1 wherein the application is a first application, further comprising:
   receiving a third request to use a second application, the third request being initiated by the first user and the second application being different from the first application;
   accessing a second application access rule associated with the first user and the second application;
   determining that permission is not required for the first user to use the second application based on the second application access rule; and
   enabling the first user to use the second application in response to determining that permission is not required for the first user to use the second application.

15. The computer-implemented method of claim 1 further comprising:
   providing, to the second user, information related to recent application usage of the first user,
   wherein providing the information is performed prior to receiving the response to the second request from the second user.

16. The computer-implemented method of claim 15 wherein providing, to the second user, information related to recent application usage of the first user includes providing, to the second user, information related to a time the first user has been using a first application or first application type prior to receiving the response to the second request from the second user.

17. A non-transitory computer-readable storage medium storing one or more computer programs, the one or more computer programs including instructions for controlling access to an application that, when executed, perform operations comprising:
   receiving a first request to use an application, the first request being initiated by a first user;
   accessing, from a database, an application access rule based on an identity of the first user;
   determining that permission is required for the first user to use the application based on the accessed application access rule;
   in response to determining that permission is required for the first user to use the application, sending a second request to a second user requesting permission for the first user to use the application;
   providing, to the second user, information related to the percentage of other users that have granted or denied permission to use the application for a person approximately the same age as the first user;
   receiving a response to the second request from the second user, the response including a restriction on a time of use for the application; and
   in response to receiving the response to the second request from the second user, enabling the first user to use the application for a period of time specified in the restriction on the time of use for the application.

18. A system for controlling access to an application, the system comprising:
   a memory; and
   at least one processor coupled to the memory and configured to:
      receive a first request to use an application, the first request being initiated by a first user;
      access, from a database, an application access rule based on an identity of the first user;
      determine that permission is required for the first user to use the application based on the accessed application access rule;
      in response to determining that permission is required for the first user to use the application, send a second request to a second user requesting permission for the first user to use the application;
      providing, to the second user, information related to the percentage of other users that have granted or denied permission to use the application for a person approximately the same age as the first user;
      receive a response to the second request from the second user, the response including a restriction on a time of use for the application; and
      in response to receiving the response to the second request from the second user, enable the first user to use the application for a period of time specified in the restriction on the time of use for the application.

* * * * *